United States Patent
Bleier et al.

(10) Patent No.: US 9,013,814 B2
(45) Date of Patent: Apr. 21, 2015

(54) INTERFEROMETER AND OPTICAL ASSEMBLY HAVING BEAMSPLITTER SECURING APPARATUS AND METHOD OF MOUNTING SAME

(75) Inventors: Zvi Bleier, Lloyd Harbor, NY (US); Alexander Jacobson, Deer Park, NY (US); Itai Vishnia, Setauket, NY (US)

(73) Assignee: PLX, Inc., Deer Park, NY (US)

( * ) Notice: Subject to any disclaimer, the term of this patent is extended or adjusted under 35 U.S.C. 154(b) by 355 days.

(21) Appl. No.: 13/560,510

(22) Filed: Jul. 27, 2012

(65) Prior Publication Data
US 2014/0029009 A1    Jan. 30, 2014

(51) Int. Cl.
| | | |
|---|---|---|
| *G01B 9/02* | (2006.01) | |
| *G02B 1/02* | (2006.01) | |
| *G02B 27/10* | (2006.01) | |
| *G02B 27/14* | (2006.01) | |
| *G01J 3/02* | (2006.01) | |
| *G01J 3/45* | (2006.01) | |

(52) U.S. Cl.
CPC ....... *G01B 9/02051* (2013.01); *Y10T 29/49826* (2015.01); *Y10T 29/49895* (2015.01); *G02B 1/02* (2013.01); *G02B 27/1073* (2013.01); *G02B 27/144* (2013.01); *G01B 9/02058* (2013.01); *G01J 3/0202* (2013.01); *G01J 3/45* (2013.01); *G01J 3/0286* (2013.01)

(58) Field of Classification Search
USPC .................................. 359/833, 834, 618, 871
See application file for complete search history.

(56) References Cited

U.S. PATENT DOCUMENTS

| | | |
|---|---|---|
| 2,626,771 A | 1/1953 | Krohm |
| 3,310,264 A | 3/1967 | Appleton |
| 3,526,381 A | 9/1970 | Pepe |
| 3,663,084 A | 5/1972 | Lipkins |
| 3,667,718 A | 6/1972 | Goslin et al. |

(Continued)

FOREIGN PATENT DOCUMENTS

| | | |
|---|---|---|
| WO | 2007120476 A2 | 10/2007 |
| WO | 2013078281 A2 | 5/2013 |

OTHER PUBLICATIONS

Smith, S.T., Ultraprecision Mechanism Design, Chap. 4, "Flexure Design for Positioning and Control", pp. 95-112.

(Continued)

*Primary Examiner* — Hwa Lee
(74) *Attorney, Agent, or Firm* — Pergament Gilman & Cepeda LLP

(57) ABSTRACT

A frame for optics used in interferometers that may include different materials having substantially similar, identical, or as close as practicable coefficients of thermal expansion from the material(s) used to make the beamsplitter and/or compensator without warping, bending, tilting or distorting the optics. The beamsplitter and/or compensator are mounted onto the frame of the interferometer using a three-point method of mounting, preferably using three pins for each component. Preferably, the pins are made of the same material as the beamsplitter and compensator, and all three components are made of Potassium Bromide ("KBr") or Calcium Fluoride ("CaF$_2$") such that the optic instrument can operate to scan into the mid or far infrared. Stability in optical alignment is therefore achieved without requiring the optic instrument include only one material. The invention provides stability in situations where it is not possible to utilize a single material for every component of the interferometer.

38 Claims, 16 Drawing Sheets

(56) References Cited

U.S. PATENT DOCUMENTS

| | | | |
|---|---|---|---|
| 3,832,072 A | 8/1974 | Mazur |
| 3,977,765 A | 8/1976 | Lipkins |
| 4,025,792 A | 5/1977 | Harries |
| 4,193,693 A | 3/1980 | Schindler |
| 4,383,205 A | 5/1983 | Guisinger |
| 4,383,762 A | 5/1983 | Burkert |
| 4,479,625 A | 10/1984 | Martz |
| 4,556,316 A | 12/1985 | Doyle |
| 4,635,887 A | 1/1987 | Hall et al. |
| 4,710,001 A | 12/1987 | Lacey |
| 4,773,757 A | 9/1988 | Doyle |
| 4,810,092 A | 3/1989 | Auth |
| 4,815,836 A | 3/1989 | Byers et al. |
| 4,914,297 A | 4/1990 | Wieboldt et al. |
| 4,915,502 A | 4/1990 | Brierley |
| 4,918,306 A | 4/1990 | Saito |
| 4,991,961 A | 2/1991 | Strait |
| 5,002,394 A | 3/1991 | Auth |
| 5,122,901 A | 6/1992 | Bleier |
| 5,196,902 A | 3/1993 | Solomon |
| 5,239,361 A | 8/1993 | Burch |
| 5,335,111 A | 8/1994 | Bleier |
| 5,349,438 A | 9/1994 | Solomon |
| 5,440,143 A | 8/1995 | Carangelo et al. |
| 5,486,917 A | 1/1996 | Carangelo et al. |
| 5,521,698 A | 5/1996 | Carroll et al. |
| 5,543,916 A | 8/1996 | Kachanov |
| 5,610,706 A | 3/1997 | Carroll et al. |
| 5,678,409 A | 10/1997 | Price |
| 5,808,739 A | 9/1998 | Turner et al. |
| 5,861,956 A | 1/1999 | Bridges et al. |
| 5,949,543 A | 9/1999 | Bleier et al. |
| 5,949,544 A | 9/1999 | Manning |
| 6,062,697 A | 5/2000 | Bryant et al. |
| 6,141,101 A | 10/2000 | Bleier et al. |
| 6,246,052 B1 | 6/2001 | Cleveland et al. |
| 6,302,585 B1 | 10/2001 | Lee et al. |
| 6,402,330 B1 | 6/2002 | Scheidegg |
| 6,453,566 B1 | 9/2002 | Bottinelli et al. |
| 6,473,185 B2 | 10/2002 | Vishnia et al. |
| 6,639,742 B2 | 10/2003 | Snively et al. |
| 6,657,196 B2 | 12/2003 | Endo et al. |
| 6,729,735 B2 | 5/2004 | Bleier |
| 6,752,503 B2 | 6/2004 | Bleier |
| 6,786,608 B1 | 9/2004 | Bleier |
| 6,827,455 B2 | 12/2004 | Bleier |
| 6,836,968 B1 | 1/2005 | Walker et al. |
| 6,937,347 B2 * | 8/2005 | Erwin | 356/520 |
| 6,940,598 B2 | 9/2005 | Christel et al. |
| 6,945,661 B2 | 9/2005 | Bleier |
| 7,116,871 B2 | 10/2006 | Sullivan et al. |
| 7,168,817 B2 | 1/2007 | Bleier et al. |
| 7,224,464 B2 | 5/2007 | Manning |
| 7,265,369 B2 | 9/2007 | Maruo |
| 7,268,960 B2 | 9/2007 | Vishnia |
| 7,275,332 B2 | 10/2007 | Blanding |
| 7,355,697 B2 | 4/2008 | Mertz et al. |
| 7,535,572 B2 | 5/2009 | Englert |
| 7,623,234 B2 | 11/2009 | Puzey |
| 7,630,081 B2 | 12/2009 | Ressler et al. |
| 7,835,077 B2 | 11/2010 | Rosenqvist |
| 7,894,055 B2 | 2/2011 | Mertz et al. |
| 7,894,057 B2 | 2/2011 | Puzey |
| 7,995,208 B2 | 8/2011 | Jacobson et al. |
| 8,092,030 B2 | 1/2012 | Bleier |
| 8,120,853 B2 | 2/2012 | Jacobson et al. |
| 8,205,852 B2 | 6/2012 | Jacobson et al. |
| 8,205,853 B2 | 6/2012 | Jacobson et al. |
| 8,454,176 B2 | 6/2013 | Bleier |
| 8,567,968 B2 | 10/2013 | Bleier |
| 2003/0007155 A1 | 1/2003 | Ota |
| 2003/0048533 A1 | 3/2003 | Lyons, III |
| 2005/0008298 A1 | 1/2005 | Sullivan et al. |
| 2005/0094155 A1 | 5/2005 | Hill et al. |
| 2007/0295155 A1 | 12/2007 | Bleier |
| 2008/0170231 A1 | 7/2008 | Ressler et al. |
| 2010/0012808 A1 | 1/2010 | Jacobson et al. |
| 2010/0033728 A1 * | 2/2010 | Jacobson et al. | 356/451 |
| 2011/0273778 A1 | 11/2011 | Jacobson et al. |
| 2011/0308060 A1 | 12/2011 | Bleier |
| 2011/0310504 A1 | 12/2011 | Bleier |
| 2012/0091310 A1 | 4/2012 | Jacobson et al. |
| 2012/0113522 A1 | 5/2012 | Jacobson et al. |
| 2012/0218654 A1 | 8/2012 | Bleier et al. |
| 2013/0135026 A1 | 5/2013 | Bleier et al. |
| 2013/0135622 A1 | 5/2013 | Bleier et al. |
| 2013/0138226 A1 | 5/2013 | Bleier et al. |
| 2013/0167353 A1 | 7/2013 | Bleier |
| 2013/0326862 A1 | 12/2013 | Bleier |
| 2014/0029010 A1 | 1/2014 | Bleier et al. |

OTHER PUBLICATIONS

Vehar, Christine, "Flexure Design for Precision and Control", http://www.engin.umich.edu/labs/csdl/ppslides/FlexureDesignForPrecisionAndControl_files/v3_document.html (Mar. 18, 2004).
Notice of Allowance for U.S. Appl. No. 12/537,028, dated Apr. 1, 2011.
Office Action for U.S. Appl. No. 11/674,315, dated Apr. 27, 2011.
Ex parte Quayle Communication for U.S. Appl. No. 11/674,315, dated Jul. 21, 2011.
Ex parte Quayle Communication for U.S. Appl. No. 12/505,279, dated Nov. 14, 2011.
Notice of Allowance for U.S. Appl. No. 13/180,922, dated Dec. 30, 2011.
Notice of Allowance for U.S. Appl. No. 12/505,279, dated Feb. 16, 2012.
Notice of Allowance for U.S. Appl. No. 13/324,459, dated May 4, 2012.
Office Action for U.S. Appl. No. 13/208,887, dated Nov. 7, 2012.
Office Action for U.S. Appl. No. 13/211,507, dated Nov. 27, 2012.
Office Action for U.S. Appl. No. 13/560,583, dated May 10, 2013.
Interview Summary for U.S. Appl. No. 13/560,583, dated May 29, 2013.
Ex parte Quayle Communication for U.S. Appl. No. 13/208,887, dated Jul. 11, 2013.
Office Action for U.S. Appl. No. 13/777,267, dated Sep. 13, 2013.
Office Action for U.S. Appl. No. 13/560,583, dated Oct. 22, 2013.
Office Action for U.S. Appl. No. 13/965,333, dated Dec. 31, 2013.
Office Action for U.S. Appl. No. 13/777,267, dated Jan. 15, 2014.
International Search Report and Written Opinion, dated Jul. 14, 2008 for International Application No. PCT/US07/08103, filed Apr. 3, 2007.
Office Action, mailed Sep. 19, 2008, in U.S. Appl. No. 11/674,315.
Interview Summary for U.S. Appl. No. 13/777,267, dated Apr. 28, 2014.
Advisory Action for U.S. Appl. No. 13/777,267, dated Apr. 2, 2014.
Office Action for U.S. Appl. No. 13/560,583, dated Mar. 19, 2014.
International Search Report and Written Opinion, dated Mar. 27, 2013, for International Application No. PCT/US12/66219, filed: Nov. 21, 2012.

* cited by examiner

INTERFEROMETER AND OPTICAL ASSEMBLY HAVING BEAMSPLITTER SECURING APPARATUS AND METHOD OF MOUNTING SAME

BACKGROUND OF THE INVENTION

This invention relates to the field of optical devices, and, more particularly, to interferometers, including monolithic interferometers, optical assemblies, and methods of mounting same. Such interferometers or interferometer optical assemblies provide stability in optical alignment by, among other factors, using a single material. The present invention provides stability in situations where it is not possible to utilize a single material for every component of the interferometer or optical assembly.

Fourier transform infrared ("FTIR") spectrometers are well known in the art. Michelson interferometers function by splitting a beam of electromagnetic radiation into two separate beams via a beam splitter. Each beam travels along its own path, e.g., a reference path of fixed length and a measurement path of variable length. A reflecting element, such as a retroreflector, is placed in the path of each beam and returns them both to the beam splitter. The beams are there recombined into a single exit beam. The variable path length causes the combined exit beam to be amplitude modulated due to interference between the fixed and variable length beams. By analyzing the output beam, the spectrum, which is the intensity of the input beam as a function of frequency, may be derived after suitable calibration.

When the above interferometer is employed in a FTIR spectrometer, the exit beam is focused upon a detector. If a sample is placed such that the modulated beam passes through it prior to impinging upon the detector, the analysis performed can determine the absorption spectrum of the sample. The sample may also be placed otherwise in the arrangement to obtain other characteristics.

Because Michelson interferometers rely upon the interference from recombination of the two beams, a quality factor of such a device is the degree to which the optical elements remain aligned. The beam splitter and mirror-supporting structures must be isolated to the greatest possible degree from extraneous forces which would tend to produce distortions of the structure. Such forces and resultant distortions introduce inaccuracies into the optical measurements. The forces may arise from vibrational effects from the environment and can be rotational or translational in nature. A similarly pervasive issue concerns distortions due to changes in the thermal environment. Needless to say, considerations of weight, size, facility of use, efficiency, manufacturing cost and feasibility are also of primary importance.

Prior art optical assemblies used in the construction of standard Michelson interferometers, and other type interferometers, have consisted primarily of structures having parts which are in need of high accuracy alignment. For example, the arrangement of the two reflecting assemblies and the beamsplitter must be highly accurate in the perpendicular and reflecting arrangements in order to avoid errors introduced due to any such misalignment. The trouble with these prior art interferometers and optical assemblies arises from the costs involved in meticulously aligning the optical elements, the necessity for active subsystems to maintain the alignment, and subsequent costs to service and readjust the interferometer if shocks and vibrations have introduced uncompensated misalignment.

U.S. Pat. Nos. 5,949,543 and 6,141,101 to Bleier and Vishnia addressed the above issues with a monolithic interferometer constructed from a single material, preferably a material having a low coefficient of thermal expansion. However, it is not always possible to utilize a monolithic interferometer made out of a single material because materials having reflectance/transmittance properties appropriate to a necessary wavelength of light may not technically or economically lend themselves to elements of the monolithic interferometer other than the optical elements. For example, certain materials do not possess sufficient mechanical properties to be used as support structures for the interferometer, and certain materials can be expensive, require frequent cleaning and may be easily damaged.

Accordingly, it would be desirable to provide an interferometer and/or an interferometer optical assembly with optical elements of a different material than the remainder of the interferometer or interferometer optical assembly that, nevertheless, provides high accuracy measurements. Such an interferometer or interferometer optical assembly would facilitate easy and cost effective maintenance by replacement of the entire optical assembly, which optical assembly is not subject to misalignment from shocks, vibrations, or temperature changes due to the monolithic structure of the assembly. It would be further desirable to provide an optical assembly which allows for use of multiple wavelength light sources to achieve a "fringe" result in a spectrometry application.

It would also be desirable to provide a method of mounting an interferometer and/or an interferometer optical assembly to achieve the desired results.

SUMMARY OF THE INVENTION

In accordance with the invention, an improved interferometer, an interferometer optical assembly and method of mounting same are provided. Accordingly, it is a broad object of the invention to provide an interferometer or interferometer optical assembly for use with a precision instrument comprising at least a frame having a first plate and a second plate and a beamsplitter having a first surface and a second surface, the beamsplitter being made of a first material extending between the first plate and the second plate of the frame. Preferably, the one or more components of the frame are all formed of one of the same second material or materials that is/are different from the first material, but having substantially the same or the same coefficient of thermal expansion as that of the first material, or having a coefficient of thermal expansion that is as close as practicable thereto, such that the beamsplitter has limited or no exposure to at least one of bending, warping, tilting and distorting. The beamsplitter is preferably located inside the frame in an interior space thereof.

The three-point or three-pin arrangement of the present invention may be used to mount (e.g., kinematically, semi-kinematically, etc.) any type of optic, such as, but not limited to, a mirror, a beamsplitter, a compensator, other types of reflectors, a refractor, etc., into any type of instrument, such as, but not limited to, an interferometer, an interferometer optical assembly, a frame, any other optical device or precision optical device, etc. Using the three-pin arrangement of the present invention provides several advantages, including, but not limited to, permitting the use of interchangeable parts (e.g., pin(s)) for each point of contact, providing better adjustability in assembly, saving time and money by not requiring precision machining on the optic, etc. For example, the beamsplitter may be attached to the frame by a securing apparatus having three pins that operate to kinematically mount the beamsplitter to the frame using a three-pin or three-point arrangement. The beamsplitter securing apparatus may be used with one or more embodiments of the interferometer or the interferometer optical assembly having the first and second materials as aforementioned, or, alternatively, may be used with one or more other embodiments of the interferometer or the interferometer optical assembly comprising any material (and not being limited to the first and the second materials as aforementioned). The three pins each have a first end and a second end, and preferably include a bonding material or shell on the periphery thereof. When using the beamsplitter securing apparatus, the beamsplitter preferably includes at least one landing area or surface (which may be coplanar) on a third surface thereof and at least two landing areas or surfaces (which may be coplanar) on a fourth surface thereof, the third and fourth surfaces extending between the first and second surfaces of the beamsplitter. Corresponding holes may be located on the first and second plates such that the corresponding holes operate to receive at least one pin therein while the pins are disposed on or against their respective landing areas or surfaces to form one or more attachments between the beamsplitter and the first and second plates of the frame. The third surface of the beamsplitter operates to be disposed substantially against or adjacent to the first plate of the frame, and the fourth surface of the beamsplitter operates to be disposed substantially against or adjacent to the second plate of the frame.

A mirror or mirrors may be attached to the frame, the mirror(s) having a reflecting surface in a reflecting relation with the beamsplitter.

The interferometer or interferometer optical assembly may further comprise a compensator extending between the first plate and the second plate of the frame. The compensator may be disposed between the mirror and the beamsplitter, and the compensator may have its own compensator securing apparatus having three pins that operate to kinematically mount the compensator to the frame using a three-pin or three-point arrangement. The compensator securing apparatus may be used with one or more embodiments of the interferometer or the interferometer optical assembly having the first and second materials as aforementioned, or, alternatively, may be used with one or more other embodiments of the interferometer or the interferometer optical assembly comprising any material (and not being limited to the first and the second materials as aforementioned). The three pins each have a first end and a second end, and preferably include a bonding material or shell on the periphery thereof. When using the compensator securing apparatus, the compensator preferably includes at least one landing area or surface (which may be coplanar) on a third surface thereof and at least two landing areas or surfaces (which may be coplanar) on a fourth surface thereof, the third and fourth surfaces extending between the first and second surfaces of the compensator. Corresponding holes may be located on the first and second plates such that the corresponding holes operate to receive at least one pin therein while the pins are disposed on or against their respective landing areas or surfaces to form one or more attachments between the compensator and the first and second plates of the frame. The third surface of the compensator operates to be disposed substantially against or adjacent to the first plate of the frame, and the fourth surface of the compensator operates to be disposed substantially against or adjacent to the second plate of the frame.

The optical assembly may also have a second mirror or mirrors attached to the frame having a reflecting surface facing away from the frame interior space (e.g., for use with a retroreflector located outside of the frame), or otherwise forming a part of the second mentioned measurement path of variable optical path length of the interferometer.

The optical assembly may also have a protruding member to further reduce and/or eliminate one or more stresses, including stresses resulting from temperature change, therefrom.

In an alternative embodiment of the present invention, an interferometer is disclosed comprising a radiation source; a beamsplitter having a first surface and a second surface, the beamsplitter comprising at least one first material; a frame comprising a first plate and a second plate having the beamsplitter extending therebetween; a retroreflector disposed externally to the frame, the retroreflector operating to move relative to the frame; a first mirror attached to the frame and having a reflecting surface in a first direct reflecting relation with the beamsplitter; and a second mirror attached to the frame and having a reflecting surface in a second direct reflecting relation with the retroreflector, wherein: (i) the retroreflector has a retroreflection relation with both the beamsplitter and the second mirror; (ii) the frame comprises at least a second material that is different from the at least one first material; and (iii) the at least one first material has a coefficient of thermal expansion that is identical to or substantially similar to a coefficient of thermal expansion of the at least second material, or has a coefficient of thermal expansion that is as close as practicable thereto, such that the beamsplitter has limited or no exposure to at least one of bending, warping, tilting and distorting. The interferometer may incorporate one or more features as discussed herein of the interferometer optical assembly of the present invention. For example, the retroreflector may be external to an interior space of the frame, moveable relative to the frame and has a retroreflection relation with both the beamsplitter and the second mirror. The beamsplitter may be attached to the frame by a beamsplitter securing apparatus having at least three pins that operate to kinematically mount the beamsplitter via a three-pin or three-point arrangement as aforementioned. A compensator and/or compensator securing apparatus may be employed with the interferometer in one or more embodiments. The described interferometer may have the same optional components, structure, etc. as the interferometer optical assembly described herein.

The method of mounting the one or more components of the interferometer and/or interferometer optical assembly comprises at least disposing a beamsplitter having a first surface and a second surface in between a first plate and a second plate of a frame such that the beamsplitter extends between the first plate and the second plate, the beamsplitter comprising at least one first material, wherein (i) the frame comprises at least a second material that is different from the at least one first material; and (ii) the at least one first material has a coefficient of thermal expansion that is identical to or substantially similar to a coefficient of thermal expansion of the at least second material, or has a coefficient of thermal expansion that is as close as practicable thereto, such that the beamsplitter has limited or no exposure to at least one of bending, warping, tilting and distorting. The method may include disposing, mounting, connecting, etc. one or more other components of the interferometer and/or interferometer optical assembly as described herein, including, but not limited to, a compensator such that it the compensator extends between the first plate and the second plate of the frame; a protruding member on the frame such that it extends from a surface of the optical structure, wherein the protruding member is either integrally formed with, or bonded/fused to, the surface of the frame of the optical structure, one or more support members on the frame; etc. The beamsplitter and/or the compensator may be mounted to the frame by using a respective securing apparatus each having three pins that operate to kinematically mount the beamsplitter and/or the compensator using a three-pin or three-point arrangement. The described method may incorporate forming, providing, disposing, etc. the same optional components, structure, etc. as the interferometer optical assembly and/or interferometer described herein.

Accordingly, it is an object of the invention to provide an improved interferometer, optical assembly and method of mounting same.

Another object of the invention is to provide an improved interferometer and/or optical assembly for an optical structure which causes minimal external stresses to, and reduces and/or eliminates tilting, bending, warping, distorting, etc. of, the reflective and refractive surfaces, such as the beamsplitter, compensator and mirror(s) of the interferometer and/or interferometer optical assembly.

A further object of the invention is to provide an improved interferometer and/or optical assembly that causes minimal external stresses to, and reduces and/or eliminates tilting, bending, warping, distorting, etc. of one or more components thereof by using at least two different materials for the one or more components, where the two different materials have the same or substantially the same coefficient of thermal expansion, or coefficients of thermal expansion that are as close as practicable to each other.

Yet a further object of the invention is to provide an improved interferometer and/or optical assembly wherein the mounting of the components of the interferometer is easy and results in a secure, structural design of the interferometer and/or interferometer optical assembly.

It is even a further object of the invention to provide a method of mounting one or more components of an interferometer and/or optical assembly.

Other objects of the invention will in part be obvious and will in part be apparent from the following description.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown. To assist those of ordinary skill in the relevant art in making and using the subject matter hereof, reference is made to the appended drawings and figures, wherein.

DETAILED DESCRIPTION OF THE PREFERRED EMBODIMENTS

An improved interferometer, optical assembly, and method of mounting same, are disclosed herein. The interferometer and/or optical assembly may include a beamsplitter and/or a compensator made from at least a first material and a frame having at least a first plate and a second plate made of at least a second material. Preferably, the first and second materials have identical or substantially the same coefficients of thermal expansion, or have coefficients of thermal expansion that are as close as practicable to each other, such that one or more components of the interferometer and/or optical assembly, including, but not limited to, the beamsplitter, the compensator, etc., have limited or no exposure to at least one of bending, warping, tilting and distorting. Preferably, one or more components of the interferometer and/or the optical assembly, such as, but not limited to, the beamsplitter, the compensator, etc., are kinematically connected to the frame using an apparatus having three pins each having a first end and a second end. The improved interferometer may have the grooved/relieved protruding member extending from a surface of the first plate or the second plate thereof, the protruding member operating to connect to a mount for mounting the interferometer to another structure and to dissipate and/or eliminate one or more stresses passing through the protruding member, thereby preventing the one or more stresses from affecting the optical assembly and/or the interferometer.

Figure 1:
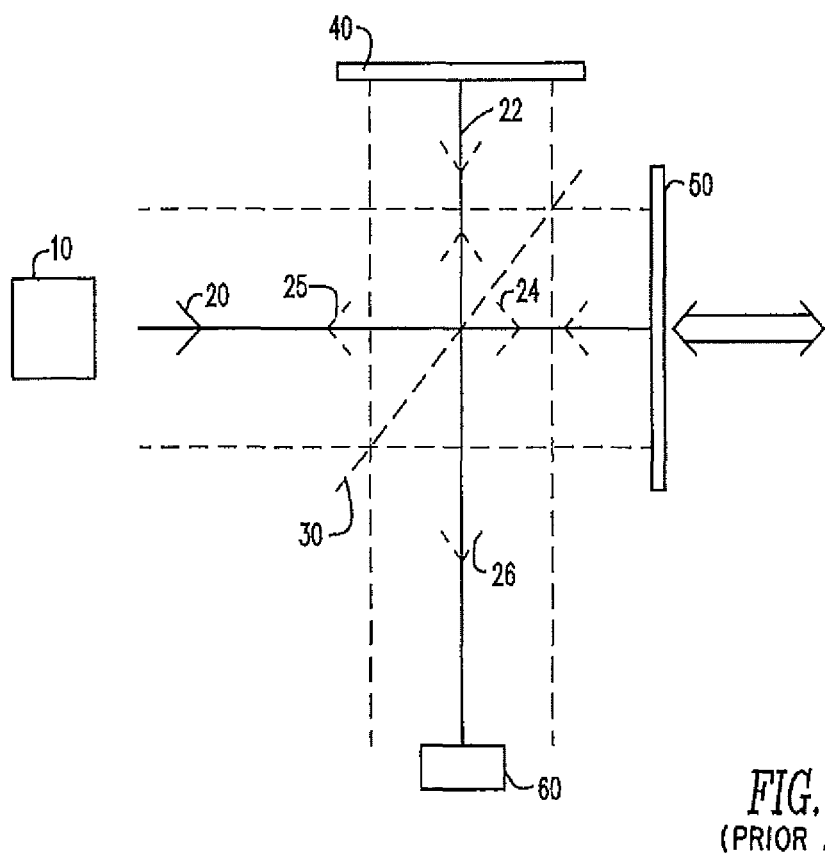
FIG. 1 is a diagram showing how radiation is reflected in a prior art Michelson interferometer.

Turning now to the details of the figures, FIG. 1 shows the general principals of a standard Michelson interferometer. The Michelson interferometer has a radiation source 10 which sends a radiation beam 20 towards beamsplitter 30 which is situated at an angle to two mirrors, a fixed mirror 40 and a movable mirror 50. Radiation beam 20 is partially reflected toward fixed mirror 40 in the form of radiation beam 22, and is partially transmitted through beamsplitter 30 towards movable mirror 50 as radiation beam 24. Beam 22 is then reflected off of fixed mirror 40, back towards beamsplitter 30, where it is once again partially split, sending some radiation 25 back towards source 10, and some radiation 26 toward detector 60. Similarly, beam 24 reflects off of movable mirror 50 and is reflected back toward beamsplitter 30. Here also, beam 24 is again split, sending some radiation back to source 10 and other radiation 26 toward detector 60.

Detector 60 measures the interference between the two radiation beams emanating from the single radiation source. These beams have, by design, traveled different distances (optical path lengths), which creates a fringe effect which is measurable by detector 60.

Figure 2:
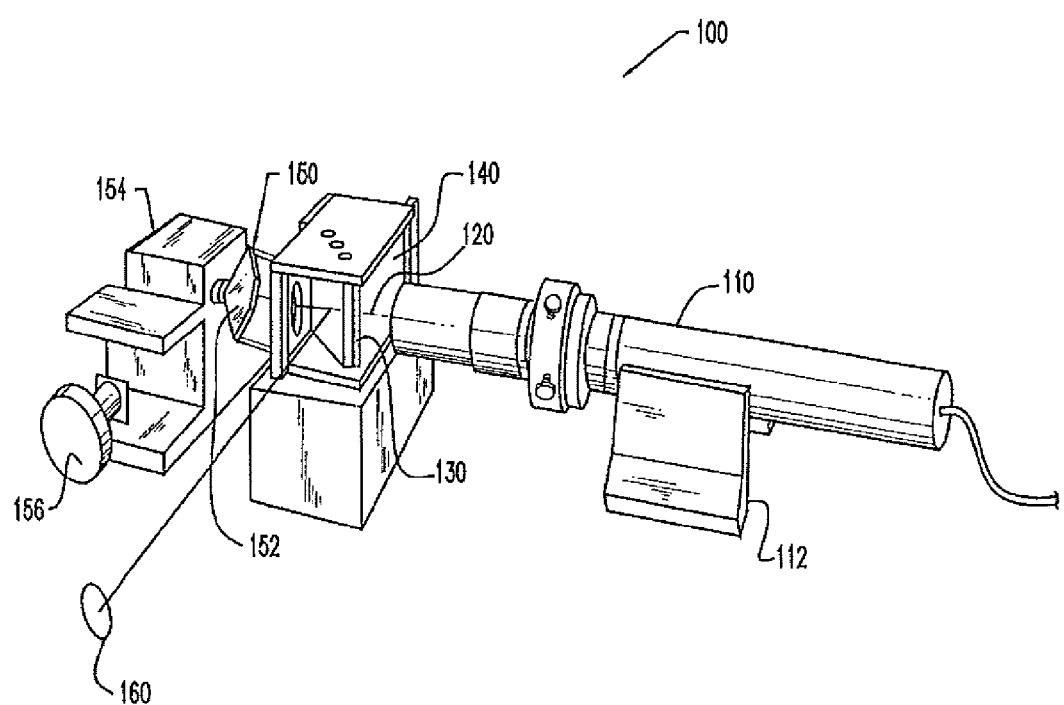
FIG. 2 is a perspective view of an interferometer having the monolithic optical assembly of the invention.

FIG. 2 shows the lay out and component structure of a Michelson interferometer of the prior art, e.g., U.S. Pat. No. 6,141,101 to Bleier, herein incorporated by reference. FIG. 2 shows interferometer 100, and includes a radiation source 110, a beamsplitter 130, a movable reflecting assembly 150, a fixed reflecting assembly 140 and a detector 142. Radiation source 110 is mounted in a secure position by mounting assembly 112. With radiation source 110 in mounting assembly 112, radiation beam 120 is alignable along a path which will fix the direction of the beam at the appropriate angle to beamsplitter 130.

Radiation source 110 can be collimated white light for general interferometry applications, such as optical surface profiling, collimated infrared light for an infrared spectrometer, a single collimated radiation intensity laser light source, etc., for accurate distance measurements or any now known, or which become known in the future, light/radiation source used in spectroscopy, measurement, or other use. Additionally or alternatively, radiation source 110 may be a broadband light source (i.e., a light source that radiates on a broadband wavelength; also referred to herein as (and used interchangeably with) "light", "light source", "radiation", "light source/beam", "radiation source", "radiation beam", "radiation/light source", "white light source", and "radiation/light beam").

Movable reflecting assembly 150 may utilize a hollow corner-cube retroreflector 152. The hollow corner-cube retroreflector 152 could be made in accordance with the disclosure of U.S. Pat. No. 3,663,084 to Lipkins, herein incorporated by reference.

Retroreflector 152 is mounted to a movable base assembly 144, which assembly allows for adjustment of the location of retroreflector 152 in a line along the path of beam 120. The displacement of assembly 144 is adjustable; e.g., through use of adjusting knob 146. Other means of moving assembly 144 are also anticipated by the invention, including such means that might allow for continuous, uniform movement of assembly 144. For example, means of movement of assembly 144 might be accomplished in accordance with the structure described in U.S. Pat. No. 5,335,111 to Bleier, herein incorporated by reference, or by co-pending application Ser. No. 12/505,279 filed on Jul. 17, 2009.

The use of retroreflector 152 as the movable reflecting assembly 150 allows for any angular orientation of retroreflector 152, preferably as long as edge portions of the retroreflector mirrors do not clip a portion of beam 120. Importantly, even if one or more portions of the retroreflector mirror(s) do clip a portion of beam 120, the interferometer still works.

From the foregoing, the length of the beam paths 20, 22 and 26 are fixed and known while the length of beam path 24 may be varied. The variation of the length of beam path 24 is, of course, critical to the operation of the interferometer, as is knowing the length as precisely as possible.

Figure 3:
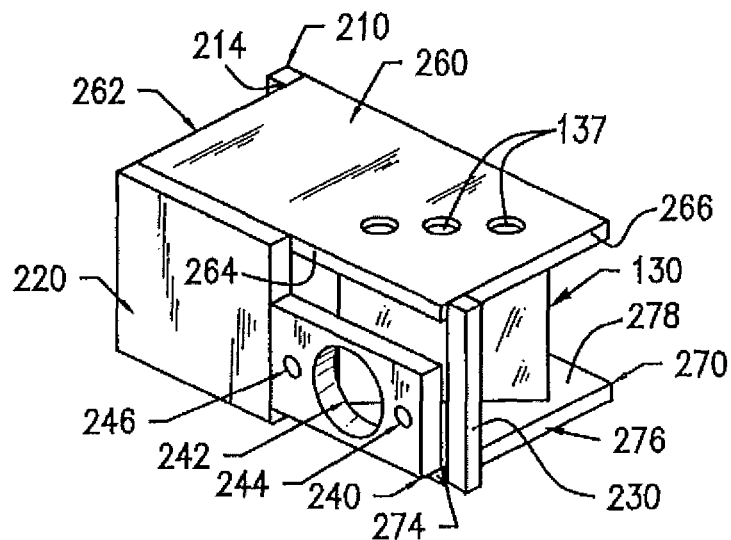
FIG. 3 is a perspective view of a monolithic optical assembly of the prior art.
Figure 4:
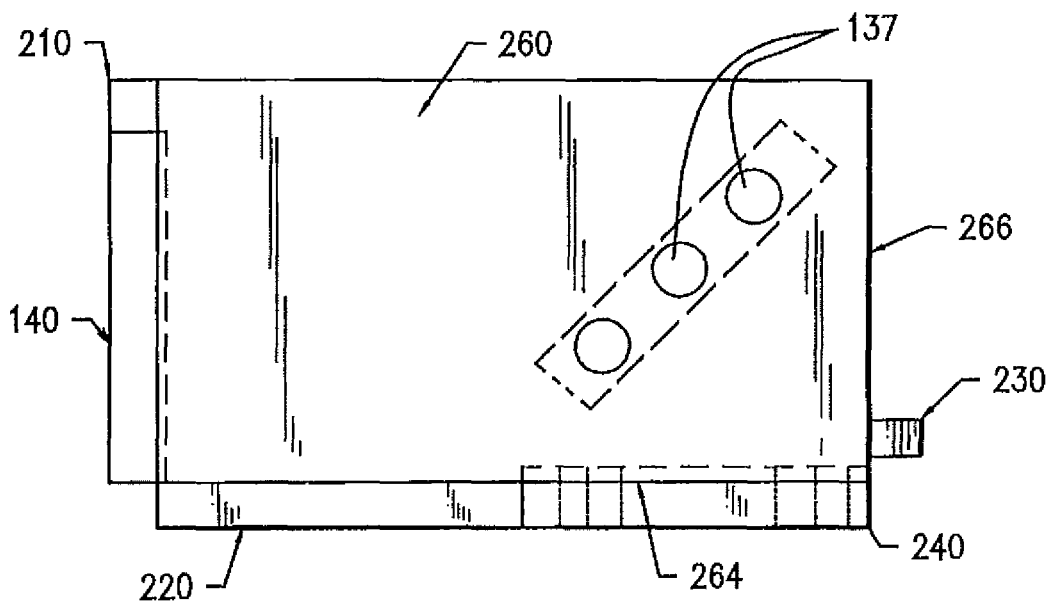
FIG. 4 is a top view of a monolithic optical assembly of the prior art.

A monolithic optical assembly 200, as seen in FIGS. 3-4, comprises a beamsplitter 130 and reflecting assembly 140 mounted within a top plate 260, a bottom plate 270 and at least first and second support members 210 and 220, respectively. As an add-on for some additional structural stability, which stability is not essential, third support member 230 can also be used. Support member 210 has an edge 214. A portion of edge 214 is bonded to a portion of edge 262 of top plate 260, while another portion of edge 214 of support member 210 is bonded to a portion of an edge surface of bottom plate 270.

As shown in FIG. 4, around the corner from support member 210, is second support member 220. Second support member 220 is bonded to top and bottom plates 260 and 270 along different portions of a surface 222 thereof. The portions of surface 222 of support member 220 are bonded to portions of an edge surface 264 of top plate 260 and edge surface 274 of bottom plate 270.

Beamsplitter 130 may be comprised of two panels bonded to each other along a common surface. The common surface is an optically flat reflecting surface having a beamsplitter coating thereon. Beamsplitter 130 is bonded along portions of top edges 137 to portions of bottom surface 267 of top plate 260, and along portions of bottom edges 138 to portions of top surface 278 of bottom plate 270. One panel of beamsplitter 130 is a compensating member. The purpose of the compensating panel is to equate the material portions of the optical path difference of the two beams created by the beamsplitter. Without the compensating panel, the beam transmitted through the beamsplitter would travel through the optical material of the beamsplitter twice, while the reflected beam would travel through optical material zero times. By adding a compensating panel, ideally of the same thickness, wedge, and material as the beamsplitter, both beams travel twice through equal portions of optical material before being recombined at the beamsplitter surface, thereby equating any differences they may have experienced in that portion of their optical path length through material. The invention also anticipates a structure where the compensating panel is separated from the beamsplitter.

The support combination of first support member 210, second support member 220 and beamsplitter 130 between top plate 260 and bottom plate 270 creates a monolithic structure. As earlier discussed, it is also possible to have third support member 230 situated between portions of third edge surfaces 266 and 276 of top and bottom plates 260 and 270, respectively, as seen in the figures.

To complete the required reflecting elements of a Michelson interferometer, it is seen in the figures that a mirror panel 140 is bonded to a portion of top surface 278 of bottom plate 270, and to a second edge surface 214 of support member 210. Mirror panel 140 is slightly over hanging top surface 278 of bottom plate 270 by a portion of a bottom edge surface of mirror panel 140, and is bonded between these touching surfaces. Bonding also takes effect between the side edge surface of mirror panel 140 that touches edge surface 214 of support member 210. Bonding must avoid distorting the optically flat nature of the reflecting surface 142 of mirror panel 140.

Since mirror panel 140 is fixedly attached to assembly 200, as has just been discussed, there is no necessity for panel 140 to be other than a single, flat paneled mirror; for example, panel 140 does not need to be a retroreflector. One of the benefits of using a retroreflector (as has been discussed earlier regarding movable reflecting assembly 150 and as discussed further below) in a structure is that the orientation of the retroreflector is unimportant. The secured mounting of panel 140 to the monolithic structure assures that the orientation of panel 140 will not fluctuate due to vibration and shock, and therefore, a retroreflector is unnecessary (although a retroreflector alternatively could of course be utilized).

The portion of beam 120 that passes through beam splitter 130 and interacts with retroreflector 152 may also be returned via a second mirror panel, similar to mirror panel 140. This second mirror panel may be made integral with second support member 220 or be a separate panel supported by one or all of the second support member 220, edge 264 of top plate 260 and bottom plate 270.

Assembly 200 can also have a fourth support member 240. While the main purpose of fourth support member 240 is not to help stabilize the monolithic structure of assembly 200, it is nevertheless called a support member herein. Instead, fourth support member 240 is positioned in relation to the path traveled by beam 120 so as to allow beam 120 to pass through opening 242 in member 240, to travel between beamsplitter 130 and movable reflecting assembly 150. One or both of elements 244, 246 can comprise reflecting elements for returning beam 120 to retroreflector 252.

All members 210, 220, 230, 240, 260, 270, 130 and 140, of assembly 200, may be made of the same material. The material preferably being fused quartz or annealed Pyrex (e.g., any type of annealed borosilicate glass and/or glasses having a low coefficient of thermal expansion). The use of identical materials allows the coefficients of expansion of the materials to be identical, so that any temperature changes experienced by assembly 200 is experienced equally throughout each member to allow assembly 200 to expand and contract uniformly, thereby substantially removing distortions in the reflecting surfaces of beamsplitter 130 and mirror panel 140.

The monolithic construction discussed above has the benefit of high thermal stability in its optical alignment. This stability derives from the construction of the unit from a single, low expansion material such as Pyrex glass (e.g., any type of annealed borosilicate glass and/or glasses having a low coefficient of thermal expansion), fused silica, Zerodur or Cervit. However, in the application of infrared Fourier transform spectroscopy, often called FTIR, it may not be possible to fabricate the beamsplitter and compensating plate from the same material as the assembly. This may occur when the need for high transmission in the infrared ("IR") is not consistent with available low expansion structural materials. In particular, the high IR transmission optical material may have a much higher thermal expansion coefficient.

Attaching optical elements having a thermal expansion coefficient different from the expansion coefficient of the remainder of the assembly could introduce wavefront distortion in the interfering optical beams or even result in mechanical failure under temperature changes. In order to take advantage of the permanent optical alignment afforded by a monolithic assembly, the connection between optical elements, e.g., beamsplitter and compensating plate, and the rest of the monolithic assembly should transmit minimal stress from this assembly to the optical elements under temperature changes.

Figure 5:
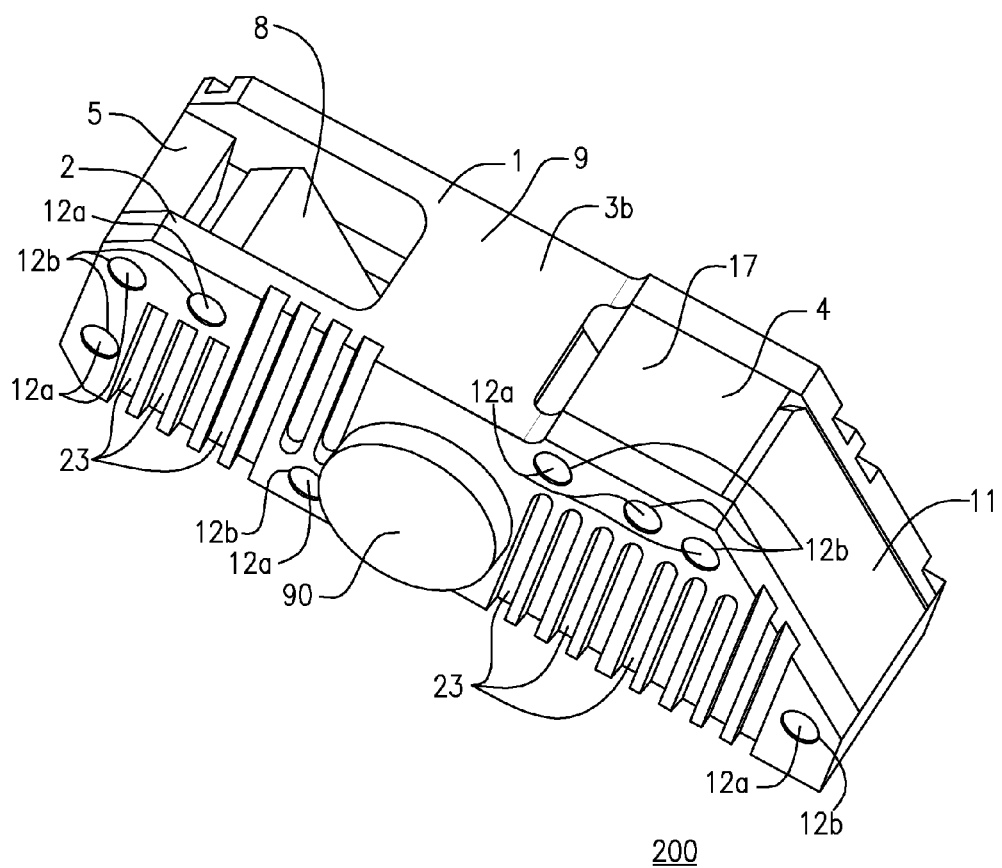
FIG. 5 is a perspective view of at least one embodiment of an interferometer in accordance with one or more aspects of the present invention.

In accordance with at least one aspect of the present invention, FIG. 5 shows at least one embodiment of an improved monolithic interferometer optical assembly 200 having at least a frame 9, a beamsplitter 11, a mirror 4, and a mirror 5. Alternatively, the mirrors 4, 5 may be removed or not installed in the interferometer optical assembly 200 yet for shipping, transportation, etc. The interferometer optical assembly 200 may further include one or more of the following components: a compensator 8, a first support member 3a, a second support member 3b, and a protruding member 90. Preferably, one or more components of the interferometer optical assembly 200 are made of at least two different materials having identical, substantially the same, or as close as practicable coefficients of thermal expansion ("CTE") such that the one or more components of the interferometer optical assembly 200, when interacting in one or more different thermal environments, have limited or no exposure to at least one of bending, warping, tilting and distorting. Preferably, the beamsplitter 11 and/or the compensator 8 are kinematically connected to the first plate 1 and the second plate 2 of the frame 9 of the interferometer optical assembly 200 using a three pin 12a mounting arrangement where the pins 12a are disposed in respective holes 12b in the first plate 1 and/or the second plate 2 of the interferometer optical assembly 200, and the pins 12a are adjacent to, and abut (e.g., substantially transversely, substantially perpendicularly, perpendicularly, etc.), one or more coplanar landing areas 56 (discussed further below) of the beamsplitter 11 and/or the compensator 8 of the interferometer optical assembly 200.

Figure 6:
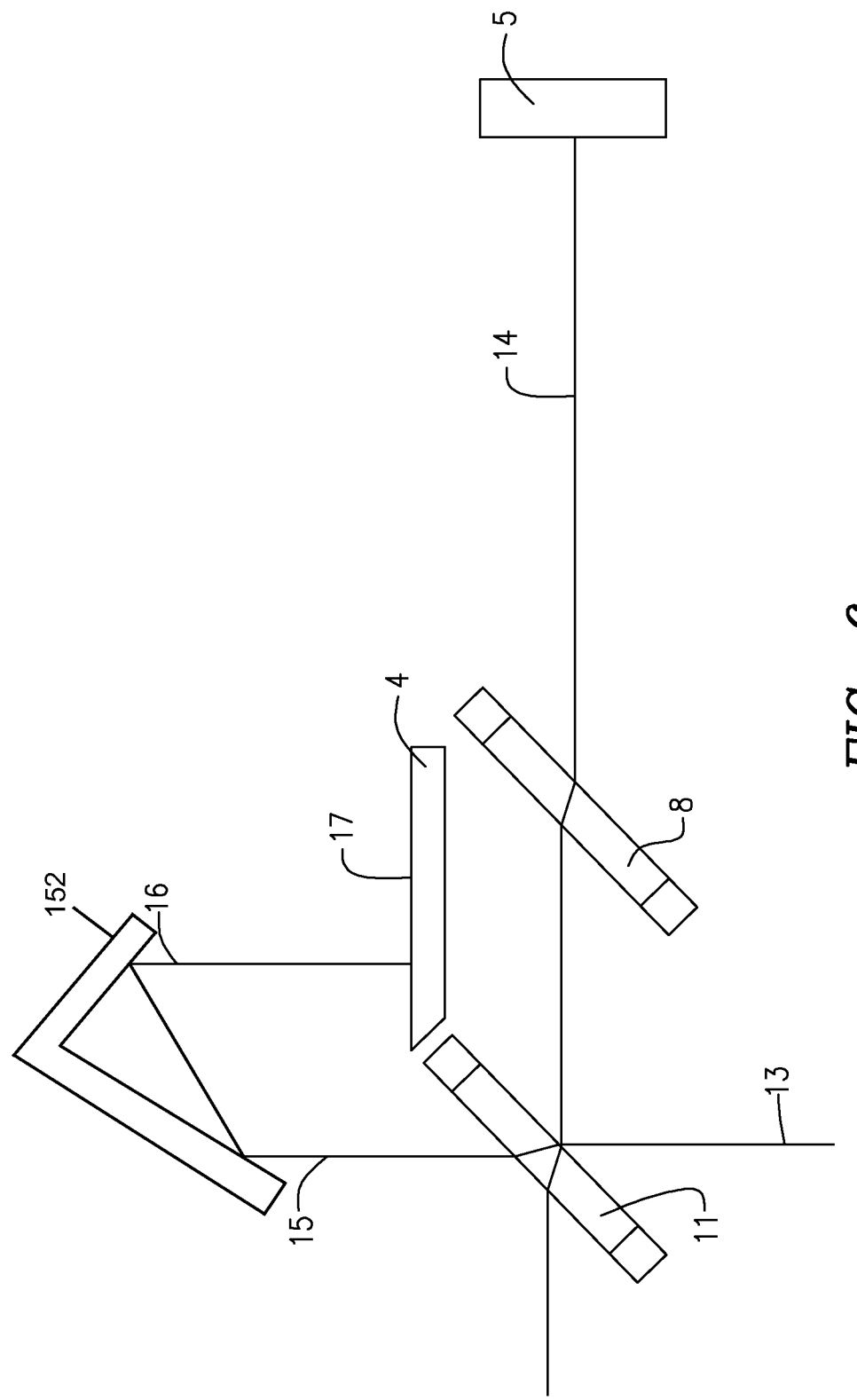
FIG. 6 is a diagram view of the optics of at least one embodiment of an interferometer in accordance with one or more aspects of the present invention.

As shown in the diagram of FIG. 6 (showing only the beams and the optical elements of at least one embodiment of the present invention), in a two-beam interferometer, two beams are created from a single incident ray 13 striking the beamsplitter 11. The two beams are a reflected beam 14 and a transmitted beam 15. The reflected beam 14 is reflected by the beamsplitter 11 towards the mirror 5. The reflected beam 14 passes through the compensator plate 8 on the way to the mirror 5 and while returning to the beamsplitter 11. In a well-aligned interferometer, the reflected beam 14 is exactly perpendicular to the fixed mirror 5. The transmitted beam 15, after exiting the beamsplitter 11, proceeds to the retroreflector 152 which reflects a beam 16 back toward a reflecting surface 17 disposed on the mirror 4 (further discussed below). In a well-aligned interferometer, the beam 15 is exactly parallel to the beam 16, which is perpendicular to the reflecting surface 17 of the mirror 4. It is an aim that, once alignment of the interferometer optical assembly 200 is achieved during assembly, final assembly may permanently and rigidly lock this alignment into the structure thereof.

The beamsplitter 11 and/or the compensator 8 must be of material transmissive to the light, often IR light, being processed by the interferometer 100 and/or the interferometer optical assembly 200. Preferably, the beamsplitter 11 and/or the compensator 8 are wedged to prevent interference effects from the front and back surfaces from creating ghost beams that can interfere with the main beams, such as beams 13, 14, 15, 16, in the application. Preferably, the compensator 8 is made of the same material as the beamsplitter 11 with substantially and ideally the same thickness and wedge angle to compensate the optical path 13-14 with the optical path 15-16, unless a purposeful miscompensation is desired. Even in such a case where a purposeful miscompensation is desired, the requirement to thermally match (or obtain as close a match as possible while obtaining the desired result) all components of assembly 200, as closely as practicable, still obtains. In one or more embodiments, any means of improved mounting of the beamsplitter 11 should be repeated for the compensator 8 for achieving the desired results. Typically, the beamsplitter 11 and/or the compensator 8 may be made from Zinc Selenide (referred to as "ZnSe").

Making the beamsplitter 11 and/or the compensator 8 from Potassium Bromide ("KBr") as opposed to ZnSe enables the interferometer optical assembly 200 to be useful to about 30 microns, whereas the ZnSe interferometer typically operates only to about 16 microns. As such, preferably, the beamsplitter 11 and the compensator 8 are made from KBr in accordance with at least one aspect of the present invention. A difficulty in making these components from KBr (which has a coefficient of thermal expansion ("CTE") of about 40 ppm/degree C.), however, is to avoid unnecessary stresses, including those resulting from temperature changes, when interacting with other components of the assembly 200. As explained above, other components of an interferometer (e.g., interferometer 100), such as one or more components of interferometer optical assembly 200, may be made from fused quartz or fine annealed Pyrex (i.e., any type of borosilicate glass or glasses having a low coefficient of thermal expansion). Again, wisdom in the art dictates or suggests that such components be made from a low expansion material (i.e., a material have a low CTE), such as, but not limited to, fused quartz or fine annealed Pyrex (which have a CTE of about 3 ppm/degree C.), to avoid thermal instability and provide high thermal stability in the optical alignment of the assembly 200. Additionally, salt windows, such as the beamsplitter 11 or the compensator 8 when made from KBr, from Calcium Fluoride ("CaF$_2$") (further discussed below), from a high CTE material (i.e., a material having a CTE of at least one of: about 5 ppm/degree C.-about 10 ppm/degree C., about 10 ppm/degree C.-30 ppm/degree C., and greater than 30 ppm/degree C.) or other fragile, thermally troublesome material(s), can be expensive, require frequent cleaning, are relatively fragile and can be easily damaged. As such, one skilled in the art would be deterred from making such components out of KBr, CaF$_2$ or other material having a high CTE due to its fragility and high CTE. However, to achieve the higher scanning range to about 30 microns for KBr as aforementioned, it is important to proceed contrary to accepted wisdom in the field of optics and interferometer assembly design by using a first material, such as KBr, for the beamsplitter 11 and the compensator 8 of the interferometer assembly 200.

Additionally or alternatively, the first material used to make the beamsplitter 11 and/or the compensator 8 may be Calcium Fluoride ("CaF$_2$") as aforementioned. As another option for such an optical application, CaF$_2$ has a CTE of 18.9 ppm/degree C. Since CaF$_2$ is also a salt, one skilled in the art would be deterred from making such optical components out of CaF$_2$ as aforementioned due to the fragility and thermally troublesome nature thereof. CaF$_2$ is useful when operating only to about 7 μm. Otherwise, however, it is much more durable than KBr, and provides an alternative to ZnSe in certain situations. As such, it is again important to proceed contrary to the aforementioned accepted wisdom by using a first material, such as CaF$_2$, for the beamsplitter 11 and the compensator 8 of the interferometer assembly 200. Additionally or alternatively, the first material may be a material having a CTE of at least one of: about 5 ppm/degree C.-about 10 ppm/degree C., about 10 ppm/degree C.-30 ppm/degree C., and greater than 30 ppm/degree C.

Thus, to compensate for the CTE difference and to provide the desired mechanical properties, it, surprisingly, is important to select a second, different material when making the frame 9 of the assembly 200. Preferably, the second material has the same CTE, substantially the same CTE, or a CTE that is as close as practicable (e.g., in the case of KBr, in the case of CaF$_2$, and/or in the case of a material having a CTE of at least one of: about 5 ppm/degree C.-about 10 ppm/degree C., about 10 ppm/degree C.-30 ppm/degree C., and greater than 30 ppm/degree C. as discussed above, a CTE of a second material is "as close as practicable" to the CTE of KBr, CaF$_2$, and/or the material having a CTE of at least one of: about 5 ppm/degree C.-about 10 ppm/degree C., about 10 ppm/degree C.-30 ppm/degree C., and greater than 30 ppm/degree C. when the CTE of the second material is at least one of: about 23 ppm/degree Celsius, higher than 23 ppm/degree Celsius, about 23.4 to about 23.6 ppm/degree Celsius, about 23 to about 27 ppm/degree Celsius, about 23 to about 28 ppm/degree Celsius, etc.) as that of the first material, e.g., KBr, CaF$_2$, and a material having a CTE of at least one of: about 5 ppm/degree C.-about 10 ppm/degree C., about 10 ppm/degree C.-30 ppm/degree C., and greater than 30 ppm/degree C., etc. Given that the second materials each have a CTE that is higher than the traditional materials of Pyrex or Quartz and that is as close as practicable to the CTE of the first material, the second materials of the present invention represent a substantial improvement over those traditional materials (such as, but not limited to, glass) for building one or more components, such as, but not limited to, the frame 9, the support members/elements 3a, 3b, etc., of an interferometer or of the interferometer optical assembly 200. It has been found that sufficient second materials, which have a CTE sufficiently close, or "as close as practicable" to, the CTE of the first material, e.g., KBr, CaF$_2$, a material having a CTE of at least one of: about 5 ppm/degree C.-about 10 ppm/degree C., about 10 ppm/degree C.-30 ppm/degree C., and greater than 30 ppm/degree C., etc., may include at least one of: Zinc, Aluminum, Magnesium, an Aluminum-Zinc or a Zinc-Aluminum alloy.

Figure 9:
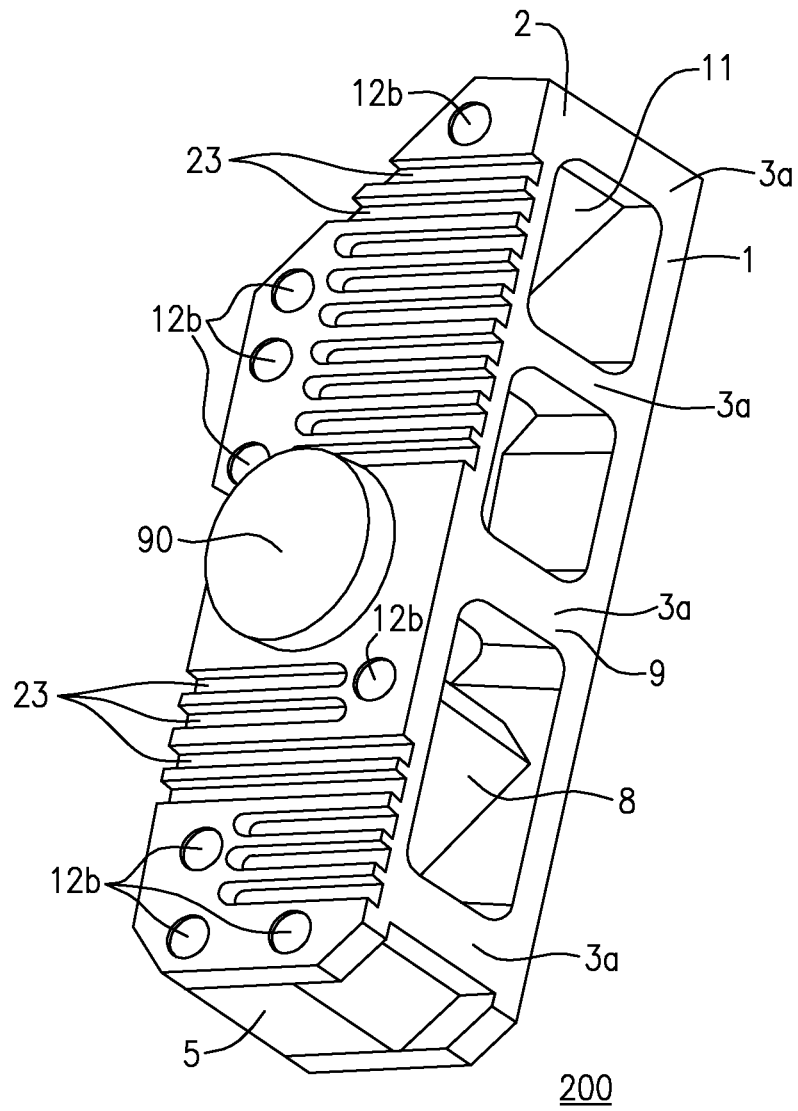
Figure 12:
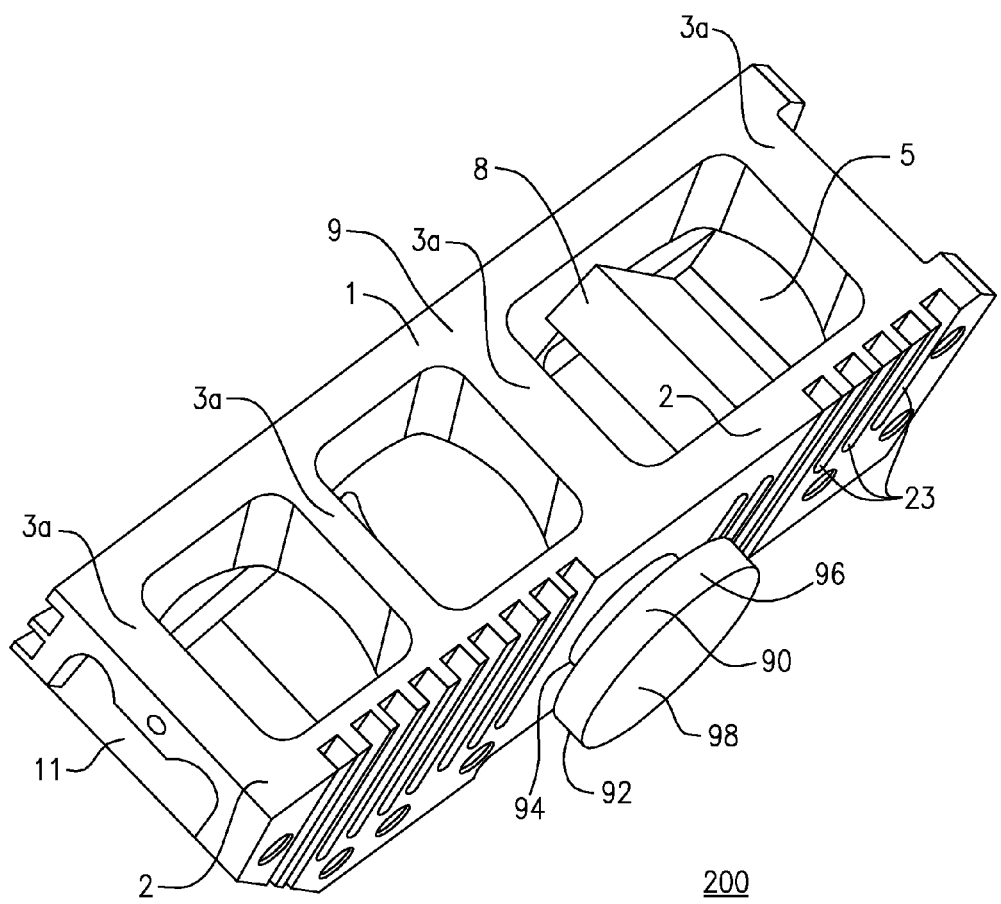
FIGS. 12-13 are perspective side views of the interferometer embodiment shown in FIG. 6 in accordance with one or more aspects of the present invention.
Figure 13:
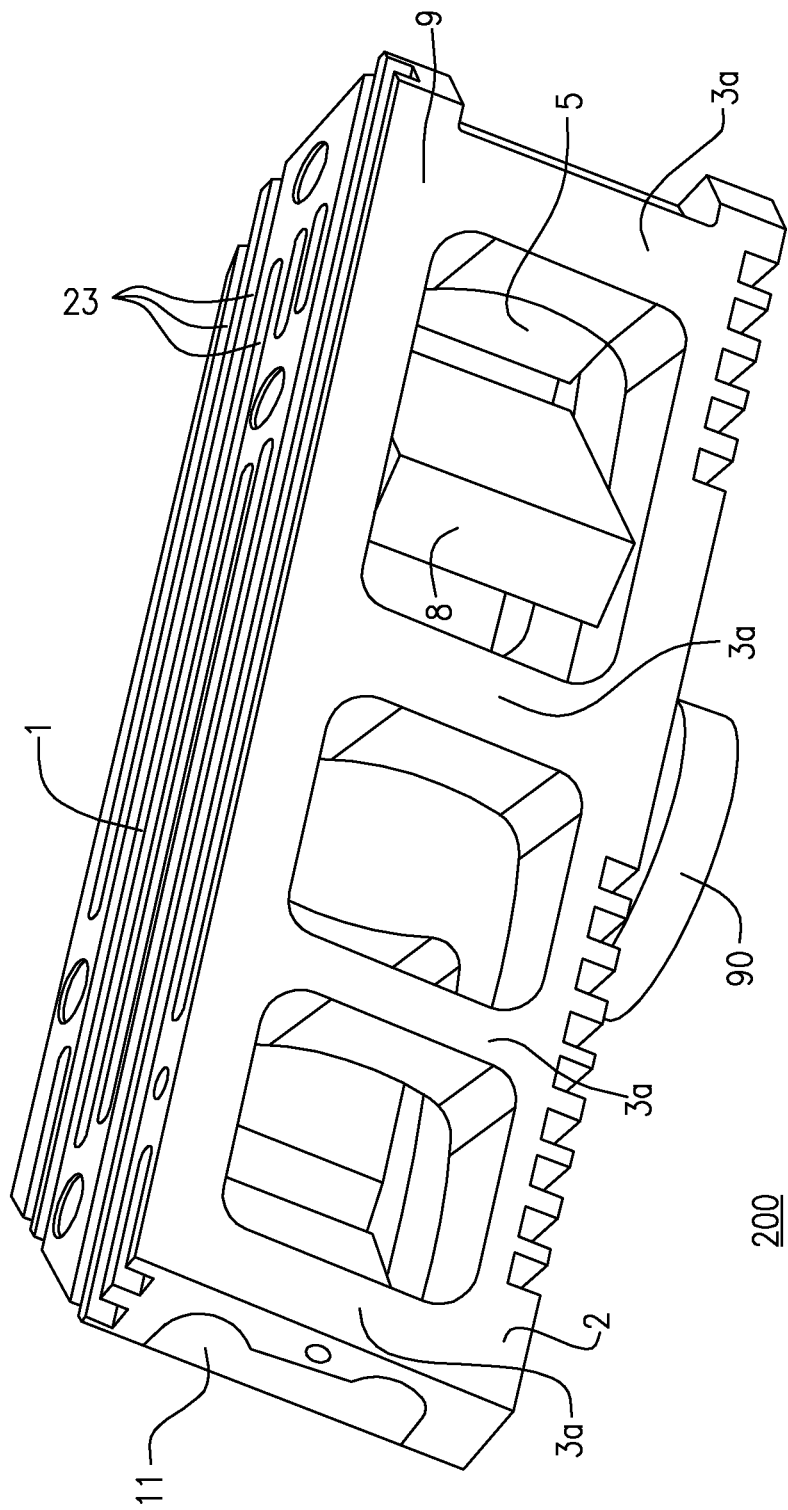
Figure 14:
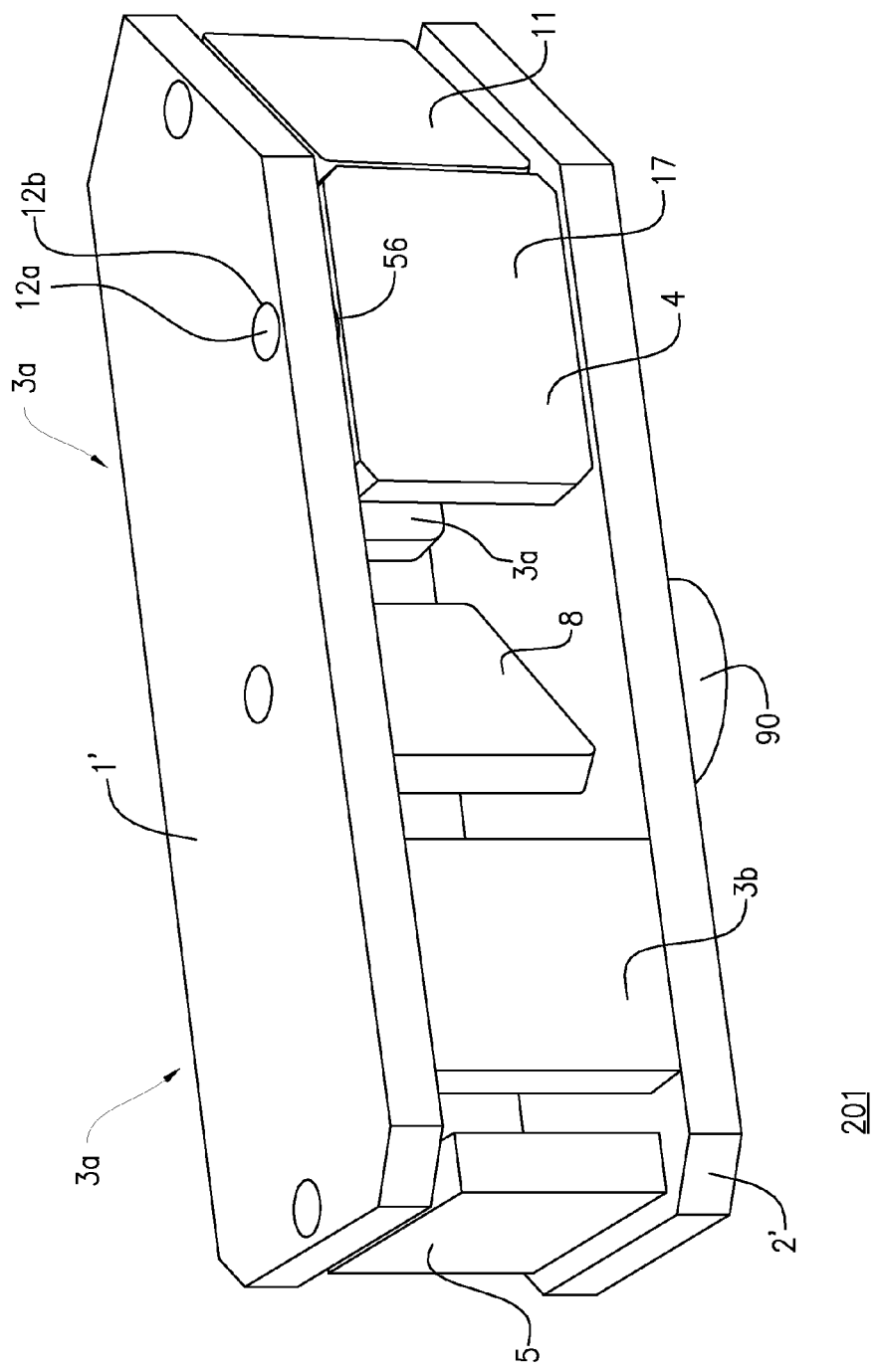
FIG. 14 is a perspective view of an alternative embodiment of an interferometer in accordance with one or more aspects of the present invention.

The frame 9 of the assembly 200 includes at least a first plate 1 and a second plate 2. Preferably, the first plate 1 and the second plate 2 are made from the same material (e.g., the aforementioned second material). When one or more components of the frame 9 are made from a different material than the material used to make the beamsplitter 11 and/or the compensator 8, preferably, the material used to make the one or more components of the frame 9 and the material used to make the beamsplitter 11 and/or the compensator 8 have identical, substantially the same, or sufficiently close (i.e., as closely as practicable) coefficients of thermal expansion such that the one or more components have limited or no exposure to at least one of bending, warping, tilting and distorting. As such, preferably, the one or more components of the frame 9 are made from one of the second materials listed above, i.e., at least one of: Zinc, Aluminum, Magnesium, an Aluminum-Zinc or a Zinc-Aluminum alloy. The frame 9 may further include at least one of the first support member 3a and the second support member 3b. Preferably, in at least one embodiment (best seen in FIGS. 5 and 7-13), the frame 9 may be formed integrally with one or more of the first support member 3a and the second support member 3b such that the first plate 1 and the second plate 2 are integral (e.g., by way of the first support member 3a, by way of the second support member 3b, etc.). Additionally, there may be a plurality of first support members 3a as shown in FIGS. 9 and 12-13 in one embodiment and as shown in FIG. 14 in an alternative embodiment. In at least another embodiment (best seen in FIG. 14), the frame 9 may be made of separate components such that the first plate 1' and the second plate 2' are not formed integrally (plate 1' may be substantially the same, and have substantially the same properties/structure incorporated therein, as the plate 1 and plate 2' may be substantially the same, and have substantially the same properties/structure incorporated therein, as the plate 2 as described above, with the exception that plate 1' is not integrally formed with at least one of plate 2', the first support member 3a, the second support member 3b, etc.), and are connected or mounted to one or more separate components, e.g., the first support member 3a, the second support member 3b, etc. For example, the one or more components (e.g., the first support member 3a, the second support member 3b, etc.) may be bonded or fused with the first plate 1 and/or the second plate 2.

The pins 12a each have first and second ends thereof, correspond to respective pin holes 12b and operate to kinematically connect, or mount, one or more components, such as, but not limited to, the mirror 5, the mirror 4, the beamsplitter 11, the compensator 8, etc., to the frame 9 of the interferometer optical assembly 200. Surprisingly, using the pins 12a in a three-point or three-pin arrangement (as opposed to some other means of connecting or mounting) to connect, or mount, the one or more components, and particular the optical components (e.g., the beamsplitter 11, the compensator 8, the mirror 5, the reflecting surface 17 of the mirror 4 and/or the mirror 4, etc.), kinematically or semi-kinematically to the frame 9 of the interferometer optical assembly 200: (i) focuses/enables only radial pressure on the pins 12a, including at temperature change(s), without compromising the tilt position of the optical elements/components of the interferometer optical assembly 200 or interferometer 100; and (ii) overcomes/avoids potential damage because of the one or more stresses, including stress(es) from temperature change(s), especially when the pins 12a are accurately positioned, disposed, sitting, etc. in their respective holes 12b. The three-point or three-pin arrangement may be used to mount (e.g., kinematically, semi-kinematically, etc.) any type of optic, such as, but not limited to, a mirror (e.g., the mirrors 4, 5), a beamsplitter (e.g., the beamsplitter 11), a compensator (e.g., the compensator 8), other types of reflectors, a refractor, etc., into any type of instrument, such as, but not limited to, an interferometer (e.g., the interferometer 100), an interferometer optical assembly (e.g., the optical assembly 200), a frame (e.g., the frame 9), any other optical device or precision optical device, etc. Using the three-pin arrangement of the present invention provides several advantages, including, but not limited to, permitting the use of interchangeable parts (e.g., pin(s) 12a), providing better adjustability in assembly, saving time and money by not requiring precision machining on the optic, etc. Additionally, surprisingly, using the three-pin arrangement provides unique structural integrity to the invention, especially when the invention includes materials having high or different CTE values or where there is a large unavoidable CTE mismatch (e.g., as is the case between KBr and a metal). This is even more valid in the one or more embodiments where the pin(s) 12a are made of the same material as the optic being held or mounted. Preferably, the pin(s) 12a are made from the same material as their respective optical components that the corresponding pin(s) 12a fix to the frame 9. For example, if the beamsplitter 11 and the compensator 8 are made of the first material, e.g., KBr, $CaF_2$, a material having a CTE of at least one of: about 5 ppm/degree C.-about 10 ppm/degree C., about 10 ppm/degree C.-30 ppm/degree C., and greater than 30 ppm/degree C., etc., then the pins 12a attached to the beamsplitter 11 and the compensator 8 may be preferably made of the first material, such as, but not limited to, KBr, $CaF_2$, a material having a CTE of at least one of: about 5 ppm/degree C.-about 10 ppm/degree C., about 10 ppm/degree C.-30 ppm/degree C., and greater than 30 ppm/degree C., etc. As an additional example, if the mirrors 4, 5 and/or the frame 9 are made of a metal alloy, then the pins 12a used to attach the mirrors 4, 5 to the frame 9 may be preferably made of the same metal alloy. Thus, one or more of the pins 12a as shown in the figures may be made of the same material or different material(s) from each other in one or more embodiments depending on the materials used to make their respective components of the interferometer optical assembly 200 or the interferometer 100.

Figure 7A:
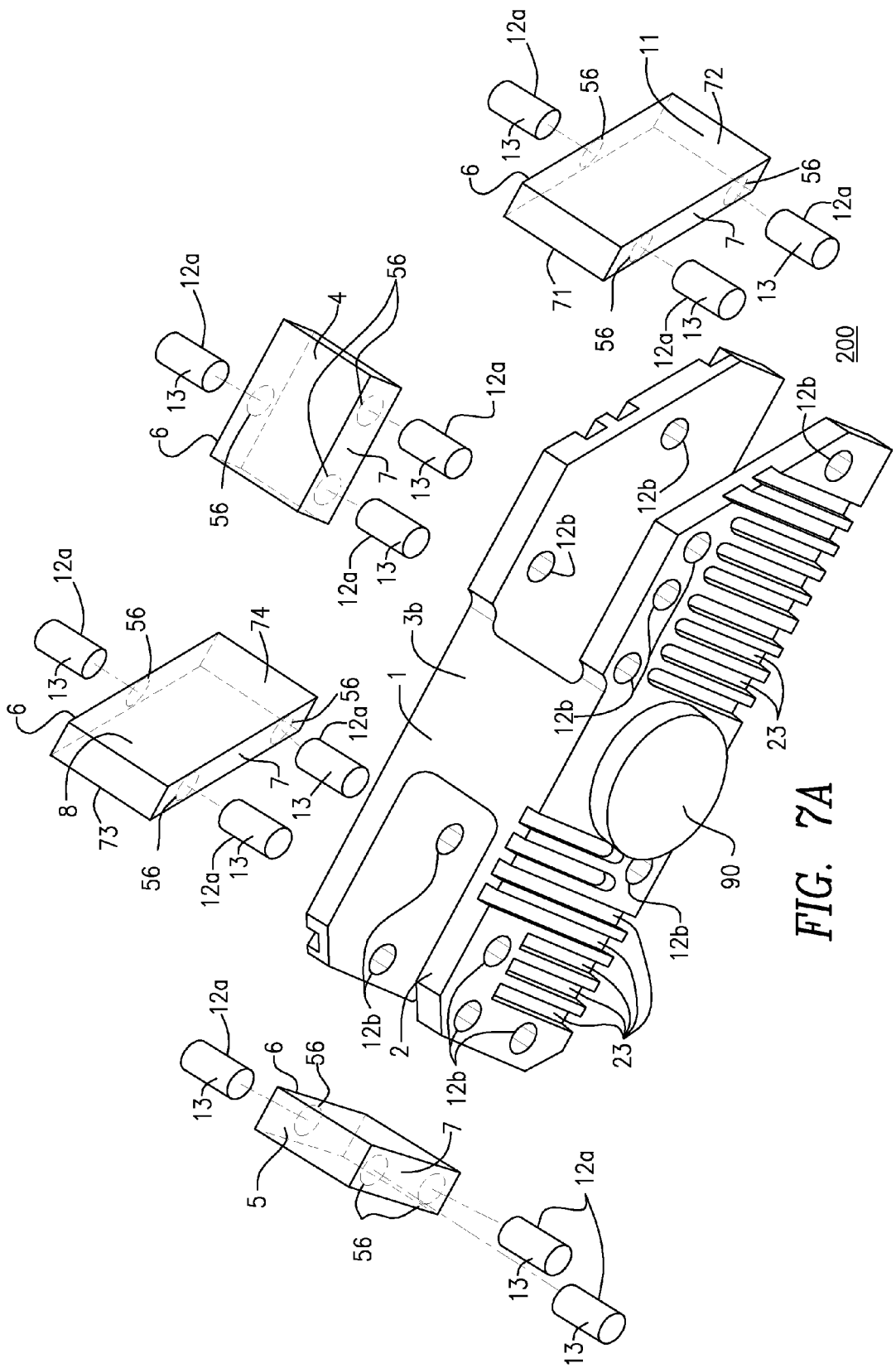
FIG. 7A is an exploded perspective view of FIG. 6 in accordance with one or more aspects of the present invention.

As best seen in the exploded view of FIG. 7A, preferably, the pin(s) 12a may be coated or encapsulated in a bonding material or shell 13 (e.g., on the periphery of the pin(s) 12a, as a coating over the entire pin(s) 12a, etc.) such that the bonding material or shell 13 operates to bond the pin(s) 12a, especially when made of KBr, to the respective hole(s) 12b and/or landing areas 56 (discussed further below). The bonding material or shell 13 further operates to dissipate the one or more stresses, which may try to affect the pin(s) 12a. Alternatively or additionally to bonding via a bonding material or shell 13, the pin(s) 12a may connect to the respective hole(s) 12b via friction fitting or fusing (or adhering) and/or the pin(s) 12a may connect to the landing areas 56 via fusing (or adhering) or adhesive action.

Unexpectedly, when the pin(s) 12a are made of the first material, such as, but not limited to, KBr, $CaF_2$, and a material having a CTE of at least one of: about 5 ppm/degree C.-about 10 ppm/degree C., about 10 ppm/degree C.-30 ppm/degree C., and greater than 30 ppm/degree C., etc., and include a bonding material on at least a periphery thereof, the pin(s) 12a: (i) are minimally affected or not affected by one or more external stresses thereon, including stress(es) resulting from temperature change(s); and (ii) maintain their structural integrity to hold the one or more components, such as, but not limited to, the mirrors 4 and 5, the beamsplitter 11, the compensator 8, etc., to the frame 9 of the interferometer optical assembly 200.

Additionally, using pin(s) 12a, rather than some other means of mounting/connecting, especially in a three-point or three-pin arrangement, proceeds contrary to wisdom in the optical assembly and interferometer art because, while one skilled in the art would normally be deterred from using pin(s) 12a due to possible structural change(s) brought on by stress and/or temperature fluctuations, the three-point or three-pin arrangement achieves a synergy where the pin(s) 12a are not subject to change by stress, such as temperature-induced stress. This is especially true where the pin(s) 12a are made of the same material, such as KBr, $CaF_2$, and a material having a CTE of at least one of: about 5 ppm/degree C.-about 10 ppm/degree C., about 10 ppm/degree C.-30 ppm/degree C., and greater than 30 ppm/degree C., etc., so that, even when the pin(s) 12a become longer or shorter due to temperature change, the pin(s) 12a maintain the structural integrity of the optical assembly 200. This is further the case when the pin(s) 12a, e.g., made of the first material, such as, KBr, $CaF_2$, and a material having a CTE of at least one of: about 5 ppm/degree C.-about 10 ppm/degree C., about 10 ppm/degree C.-30 ppm/degree C., and greater than 30 ppm/degree C., etc., are encapsulated/covered, in part or in whole, by the bonding material or shell 13. Preferably, the pin(s) 12a are not polished when made of KBr, $CaF_2$, and/or a material having a CTE of at least one of: about 5 ppm/degree C.-about 10 ppm/degree C., about 10 ppm/degree C.-30 ppm/degree C., and greater than 30 ppm/degree C. When the pin(s) 12a are arranged in a three-pin or three-point arrangement, the pins 12a form a securing apparatus, such as a beamsplitter securing apparatus, a compensator securing apparatus, etc. (as best seen in the exploded view of FIG. 7A). Alternatively, the three-pin arrangement and/or the securing apparatus, the beamsplitter securing apparatus, the compensator securing apparatus, etc. may be used with one or more embodiments of the interferometer 100 or the interferometer optical assembly 200 having the first and second materials as aforementioned, or, alternatively, may be used with one or more other embodiments of the interferometer 100 or the interferometer optical assembly 200 comprising any material (and not being limited to just the first and the second materials as aforementioned).

Figure 7B:
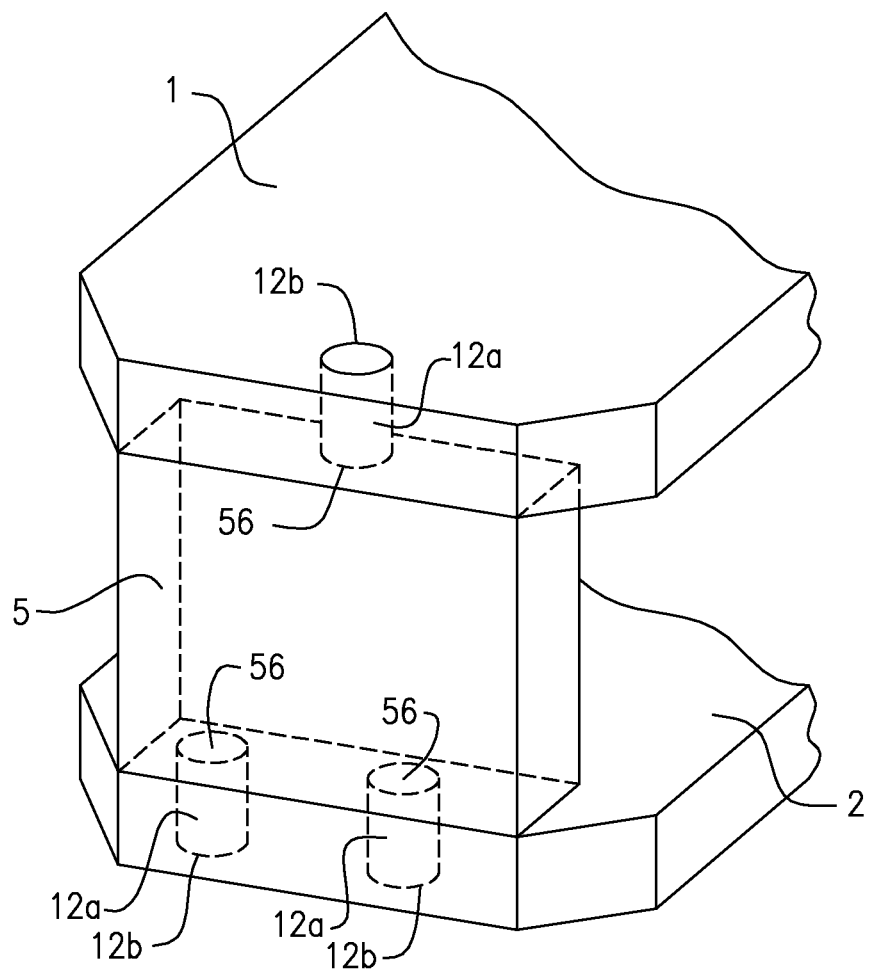
FIG. 7B is a diagram view of the landing areas or surfaces of one or more components, and of the pins and holes of the plates of at least one embodiment of an interferometer in accordance with one or more aspects of the present invention.
Figure 8:
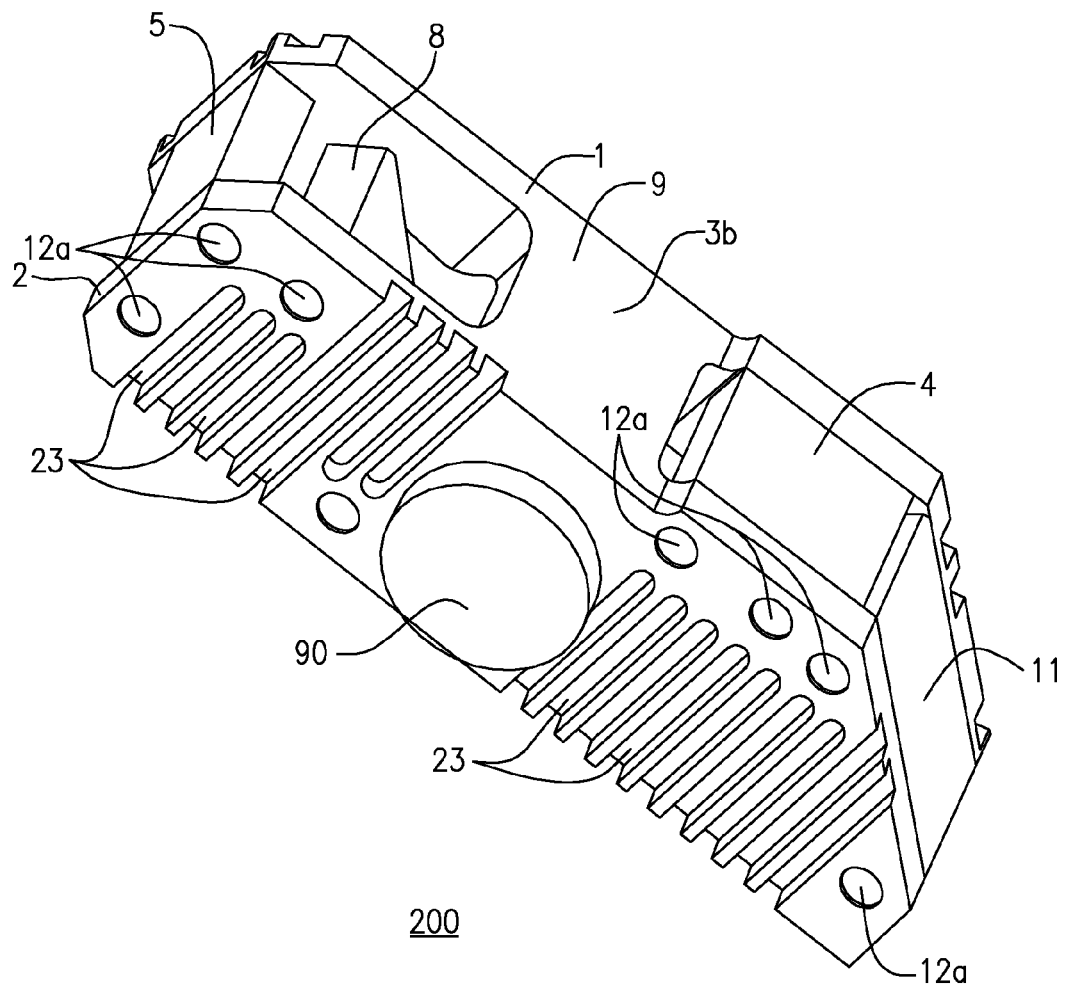
FIGS. 8-9 are perspective bottom views of the interferometer embodiment shown in FIG. 6 in accordance with one or more aspects of the present invention.

While the beamsplitter 11 includes a first surface 71 (e.g., an optically acting and/or optically related surface) and a second surface 72 (e.g., an optically acting and/or optically related surface) (best seen in FIG. 7A), preferably, the beamsplitter 11 further includes a third substantially transverse or substantially perpendicular (e.g., substantially transverse or substantially perpendicular to either or both of the first surface 71 and the second surface 72) mounting surface 6 and a fourth substantially transverse or substantially perpendicular (e.g., substantially transverse or substantially perpendicular to either or both of the first surface 71 and the second surface 72) mounting surface 7. The third surface 6 of the beamsplitter 11 extends between the first 71 and second 72 surfaces of the beamsplitter 11 and operates to be disposed against or adjacent to the first plate 1 of the frame 9. As best seen in FIGS. 7A-7B, preferably, the third surface 6 of the beamsplitter 11 may include at least one coplanar landing area or surface 56 (e.g., landing area 56 may be coplanar with the third surface 6 or any other surface, such as, but not limited to the fourth surface 7, against or on which it is disposed, etc.) for receipt of at least one pin 12a thereon or thereagainst (e.g., the pin 12a abuts (e.g., substantially transversely, substantially perpendicularly, perpendicularly, etc.) the coplanar landing area 56 as best seen diagrammatically in FIG. 7B, the pin 12a is adjacent to the coplanar landing area 56 as best seen diagrammatically in FIG. 7B, the pin 12a is pressed against the coplanar landing area 56 as best seen diagrammatically in FIG. 7B, etc.) to form a connection to the first plate 1 of the frame 9 (i.e., the connection being between the beamsplitter 11 and the first plate 1 of the frame 9). Alternatively, the landing areas or surfaces 56 may not be coplanar with, or may be coplanar with only a portion of, one or more surfaces of the one or more optical elements including same thereon or thereagainst. The fourth surface 7 of the beamsplitter 11 extends between the first 71 and second 72 surfaces of the beamsplitter 11 and operates to be disposed against or adjacent to the second plate 2 of the frame 9. Preferably, the fourth surface 7 of the beamsplitter 11 may include at least two coplanar landing areas 56 (e.g., a second coplanar landing area 56 and a third coplanar landing area 56 of the beamsplitter 11) for receipt of at least one pin 12a thereon or thereagainst (e.g., the pin 12a abuts (e.g., substantially transversely, substantially perpendicularly, perpendicularly, etc.) the coplanar landing area 56 as best seen diagrammatically in FIG. 7B, the pin 12a is adjacent to the coplanar landing area 56 as best seen diagrammatically in FIG. 7B, the pin 12a is pressed against the coplanar landing area 56 as best seen diagrammatically in FIG. 7B, etc.) to form one or more connections to the second plate 2 of the frame 9 (i.e., the one or more connections being between the beamsplitter 11 and the second plate 2 of the frame 9).

When using the beamsplitter securing apparatus having the three-pin 12a arrangement, the at least first coplanar landing area 56 operates to receive at least a first pin 12a of the three pins 12a of the beamsplitter securing apparatus thereon or thereagainst (e.g., the pin 12a abuts (e.g., substantially transversely, substantially perpendicularly, perpendicularly, etc.) the coplanar landing area 56 as best seen diagrammatically in FIG. 7B, the pin 12a is adjacent to the coplanar landing area 56 as best seen diagrammatically in FIG. 7B, the pin 12a is pressed against the coplanar landing area 56 as best seen diagrammatically in FIG. 7B, etc.) and to align with a respective first hole 12b of the first plate 1 of the frame 9 such that the at least first pin 12a of the three pins 12a of the beamsplitter securing apparatus operates to be disposed in the first hole 12b of the first plate 1 while abutting (e.g., substantially transversely, substantially perpendicularly, perpendicularly, etc.) the at least first coplanar landing area 56, thereby forming an attachment between the beamsplitter 11 and the first plate 1. The at least second coplanar landing area 56 may operate to receive at least a second pin 12a of the three pins 12a of the beamsplitter securing apparatus thereon or thereagainst (e.g., the pin 12a abuts (e.g., substantially transversely, substantially perpendicularly, perpendicularly, etc.) the coplanar landing area 56 as best seen diagrammatically in FIG. 7B, the pin 12a is adjacent to the coplanar landing area 56 as best seen diagrammatically in FIG. 7B, the pin 12a is pressed against the coplanar landing area 56 as best seen diagrammatically in FIG. 7B, etc.) and to align with a respective first hole 12b of the second plate 2 of the frame 9 such that the at least second pin 12a of the three pins 12a of the beamsplitter securing apparatus operates to be disposed in the first hole 12b of the second plate 2 while abutting (e.g., substantially transversely, substantially perpendicularly, perpendicularly, etc.) the at least second coplanar landing area 56, thereby forming an attachment between the beamsplitter 11 and the second plate 2. The at least third coplanar landing area 56 may operate to receive at least a third pin 12a of the three pins 12a of the beamsplitter securing apparatus thereon or thereagainst (e.g., the pin 12a abuts (e.g., substantially transversely, substantially perpendicularly, perpendicularly, etc.) the coplanar landing area 56 as best seen diagrammatically in FIG. 7B, the pin 12a is adjacent to the coplanar landing area 56 as best seen diagrammatically in FIG. 7B, the pin 12a is pressed against the coplanar landing area 56 as best seen diagrammatically in FIG. 7B, etc.) and to align with a respective second hole 12b of the second plate 2 such that the at least third pin 12a of the three pins 12a of the beamsplitter securing apparatus operates to be disposed in the second hole 12b of the second plate 2 of the frame 9 while abutting (e.g., substantially transversely, substantially perpendicularly, perpendicularly, etc.) the at least second coplanar landing area 56, thereby forming an attachment between the beamsplitter 11 and the second plate 2. Preferably, the three pins 12a of the beamsplitter securing apparatus: (i) have first and second ends; (ii) are sized and shaped to fit within their respective holes 12b of the frame 9 and to abut (e.g., substantially transversely, substantially perpendicularly, perpendicularly, etc.) against the coplanar landing areas 56 of the beamsplitter 11 such that the beamsplitter 11 is in substantial contact with, and/or is disposed substantially adjacent to, the first 1 and second 2 plates of the frame 9; and/or (iii) have the bonding material or shell 13 on their respective peripheries (e.g., encapsulating the entire pin(s) 12a, covering only a portion of the pin(s) 12a, etc.). Preferably, the beamsplitter 11 includes the at least one first material (e.g., at least Potassium Bromide "KBr", at least Calcium Fluoride "CaF$_2$", at least a material having a CTE of at least one of: about 5 ppm/degree C.-about 10 ppm/degree C., about 10 ppm/degree C.-30 ppm/degree C., and greater than 30 ppm/degree C., etc.) such that the beamsplitter 11 has limited or no exposure to at least one of bending, warping, tilting and distorting. As aforementioned, the beamsplitter securing apparatus may be used with one or more embodiments of the interferometer 100 or the interferometer optical assembly 200 having the first and second materials as aforementioned, or, alternatively, may be used with one or more other embodiments of the interferometer 100 or the interferometer optical assembly 200 comprising any material (and not being limited to just the first and the second materials as aforementioned).

Similarly to the general structure of the beamsplitter 11, while the compensator 8 includes a first surface 73 (e.g., an optically acting and/or optically related surface) and a second surface 74 (e.g., an optically acting and/or optically related surface) (best seen in FIG. 7A), preferably, the compensator 8 further includes a third substantially transverse or substantially perpendicular (e.g., substantially transverse or substantially perpendicular to either or both of the first surface 73 and the second surface 74) mounting surface 6 and a fourth substantially transverse or substantially perpendicular (e.g., substantially transverse or substantially perpendicular to either or both of the first surface 73 and the second surface 74) mounting surface 7. The third surface 6 of the compensator 8 extends between the first 73 and second 74 surfaces of the compensator 8 and operates to be disposed against or adjacent to the first plate 1 of the frame 9. Preferably, the third surface 6 of the compensator 8 may include at least one coplanar landing area 56 for receipt of at least one pin 12a thereon or thereagainst (e.g., the pin 12a abuts (e.g., substantially transversely, substantially perpendicularly, perpendicularly, etc.) the coplanar landing area 56 as best seen diagrammatically in FIG. 7B, the pin 12a is adjacent to the coplanar landing area 56 as best seen diagrammatically in FIG. 7B, the pin 12a is pressed against the coplanar landing area 56 as best seen diagrammatically in FIG. 7B, etc.) to form a connection to the first plate 1 of the frame 9 (i.e., the connection being between the compensator 8 and the first plate 1 of the frame 9). The fourth surface 7 of the compensator 8 extends between the first 73 and second 74 surfaces of the compensator 8 and operates to be disposed against or adjacent to the second plate 2 of the frame 9. Preferably, the fourth surface 7 of the compensator 8 may include at least two coplanar landing areas 56 for receipt of at least one pin 12a thereon or thereagainst (e.g., the pin 12a abuts (e.g., substantially transversely, substantially perpendicularly, perpendicularly, etc.) the coplanar landing area 56 as best seen diagrammatically in FIG. 7B, the pin 12a is adjacent to the coplanar landing area 56 as best seen diagrammatically in FIG. 7B, the pin 12a is pressed against the coplanar landing area 56 as best seen diagrammatically in FIG. 7B, etc.) to form one or more connections to the second plate 2 of the frame 9 (i.e., the one or more connections being between the compensator 8 and the first plate 1 of the frame 9).

When using the compensator securing apparatus having the three-pin 12a arrangement, the at least first coplanar landing area 56 operates to receive at least a first pin 12a of the three pins 12a of the compensator securing apparatus thereon or thereagainst (e.g., the pin 12a abuts (e.g., substantially transversely, substantially perpendicularly, perpendicularly, etc.) the coplanar landing area 56 as best seen diagrammatically in FIG. 7B, the pin 12a is adjacent to the coplanar landing area 56 as best seen diagrammatically in FIG. 7B, the pin 12a is pressed against the coplanar landing area 56 as best seen diagrammatically in FIG. 7B, etc.) and to align with a respective first hole 12b of the first plate 1 of the frame 9 such that the at least first pin 12a of the three pins 12a of the compensator securing apparatus operates to be disposed in the first hole 12b of the first plate 1 while abutting (e.g., substantially transversely, substantially perpendicularly, perpendicularly, etc.) the at least first coplanar landing area 56, thereby forming an attachment between the compensator 8 and the first plate 1. The at least second coplanar landing area 56 may operate to receive at least a second pin 12a of the three pins 12a of the compensator securing apparatus thereon or thereagainst (e.g., the pin 12a abuts (e.g., substantially transversely, substantially perpendicularly, perpendicularly, etc.) the coplanar landing area 56 as best seen diagrammatically in FIG. 7B, the pin 12a is adjacent to the coplanar landing area 56 as best seen diagrammatically in FIG. 7B, the pin 12a is pressed against the coplanar landing area 56 as best seen diagrammatically in FIG. 7B, etc.) and to align with a respective first hole 12b of the second plate 2 of the frame such that the at least second pin 12a of the three pins 12a of the compensator securing apparatus operates to be disposed in the first hole 12b of the second plate 2 while abutting (e.g., substantially transversely, substantially perpendicularly, perpendicularly, etc.) the at least second coplanar landing area 56, thereby forming an attachment between the compensator 8 and the second plate 2. The at least third coplanar landing area 56 may operate to receive at least a third pin 12a of the three pins 12a of the compensator securing apparatus and to align with a respective second hole 12b of the second plate 2 such that the at least third pin 12a of the three pins 12a of the compensator securing apparatus operates to be disposed in the second hole 12b of the second plate 2 of the frame 9 while abutting (e.g., substantially transversely, substantially perpendicularly, perpendicularly, etc.) the at least second coplanar landing area 56, thereby forming an attachment between the compensator 8 and the second plate 2. Preferably, the three pins 12a of the compensator securing apparatus: (i) have first and second ends; (ii) are sized and shaped to fit within their respective holes 12b of the frame 9 and to rest against or abut (e.g., substantially transversely, substantially perpendicularly, perpendicularly, etc.) the coplanar landing areas 56 of the compensator 8 such that the compensator 8 is in substantial contact with, and/or is disposed substantially adjacent to, the first 1 and second 2 plates of the frame 9; and/or (iii) have the bonding material or shell 13 on their respective peripheries (e.g., encapsulating the entire pin(s) 12a, covering only a portion of the pin(s) 12a, etc.). Preferably, the compensator 8 includes the at least one first material (e.g., at least Potassium Bromide "KBr", at least Calcium Fluoride "CaF$_2$", at least a material having a CTE of at least one of: about 5 ppm/degree C.-about 10 ppm/degree C., about 10 ppm/degree C.-30 ppm/degree C., and greater than 30 ppm/degree C., etc.) such that the compensator 8 has limited or no exposure to at least one of bending, warping, tilting and distorting. As aforementioned, the compensator securing apparatus may be used with one or more embodiments of the interferometer 100 or the interferometer optical assembly 200 having the first and second materials as aforementioned, or, alternatively, may be used with one or more other embodiments of the interferometer 100 or the interferometer optical assembly 200 comprising any material (and not being limited to just the first and the second materials as aforementioned).

Figure 10:
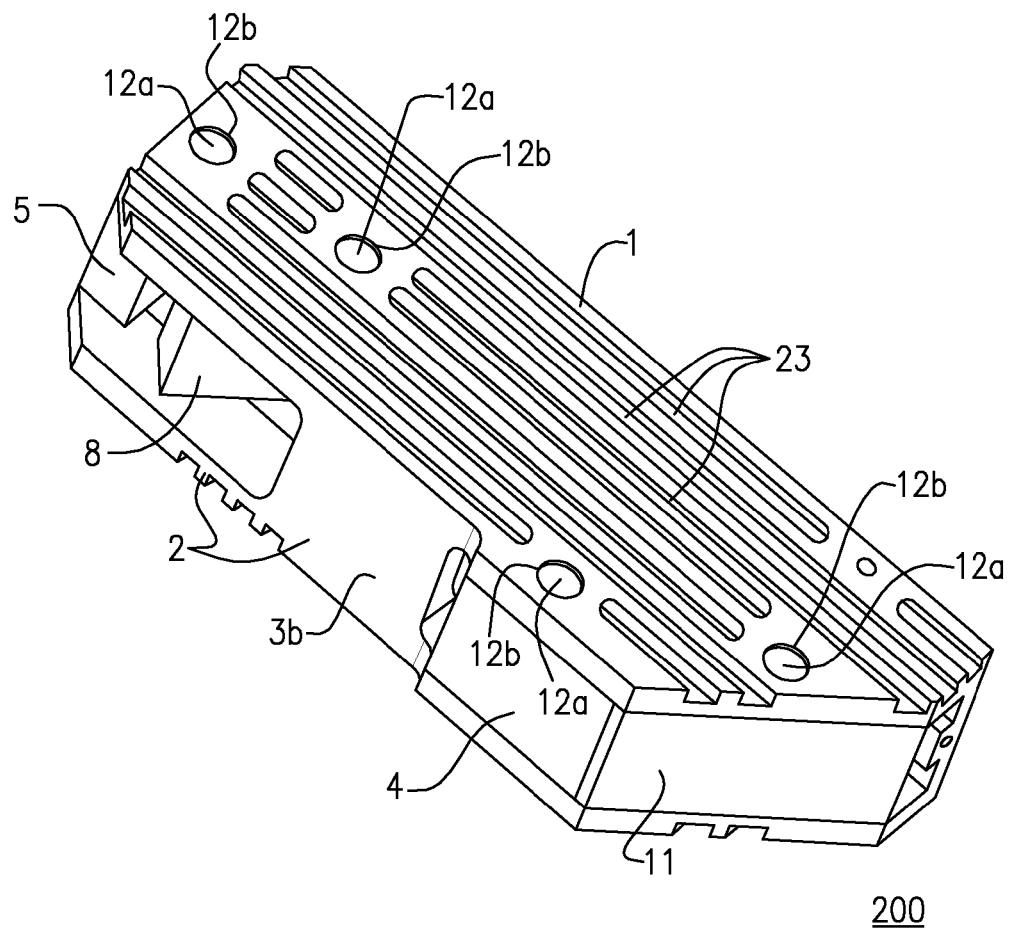
FIGS. 10-11 are perspective top views of the interferometer embodiment shown in FIG. 6 in accordance with one or more aspects of the present invention.
Figure 11:
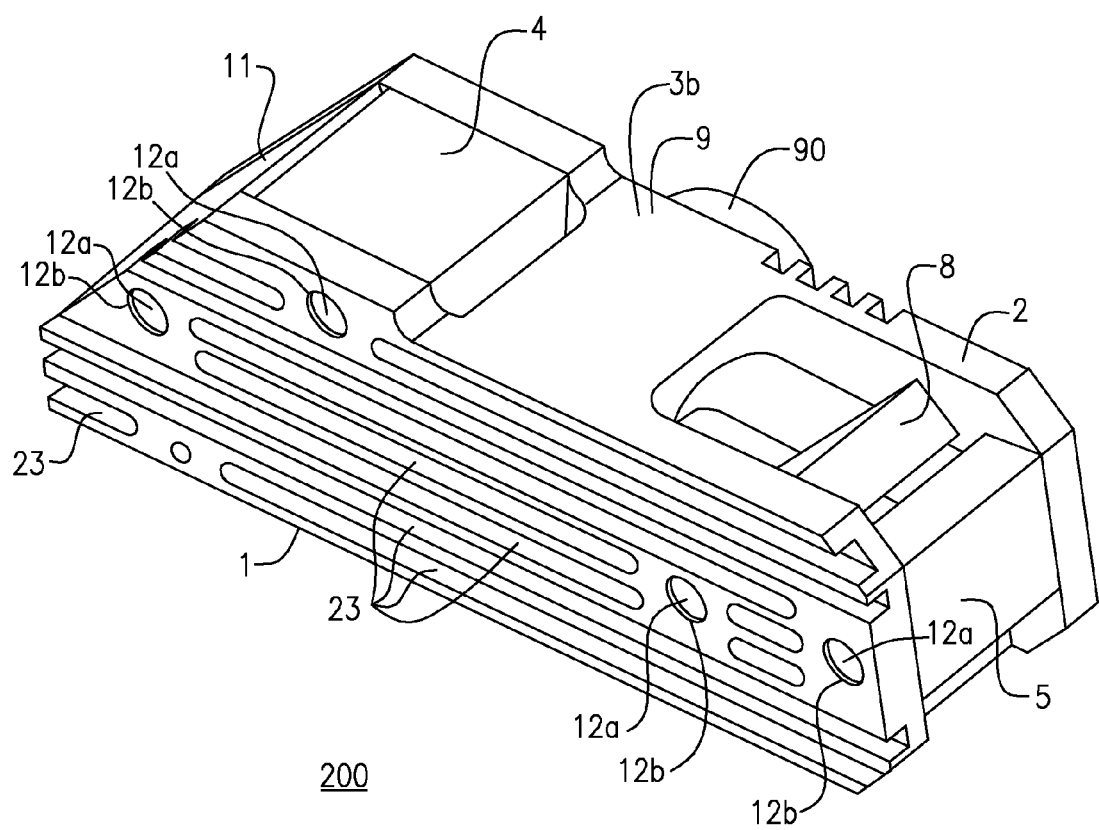

As best seen in FIGS. 5 and 10-11, preferably, the mirror 5 is inwardly facing (e.g., facing the inside of the frame 9, facing the inside of the interferometer optical assembly 200, etc.). Preferably, the mirror 5 has a pin 12a which is bonded to the first plate 1 at a corresponding pin hole 12b and has at least two pins 12a which are bonded to the second plate 2 at corresponding pin holes 12b. Said three pins 12a are preferentially made of the same or CTE-similar material as the frame 9. Preferably, the pins 12a, the frame 9 and the mirrors 4, 5 are made of the same material. Alternatively, the mirrors 4, 5 may be substantially similar or identical to each other, but differ (e.g., slightly) from the frame 9 such that the mirrors 4, 5 and the frame 9 are made of different materials. In such a situation, the pins 12a may be made either of the material used for the mirrors 4, 5 or of the material used for the frame 9. Slight material variations may exist between at least one of the frame 9, the mirror 4, the mirror 5 and the one or more pins 12a. Alternatively or additionally to bonding, the pins 12a may form a connection with the first plate 1, second plate 2 and the mirror 5 via friction fitting or fusing (or adhering). The mirror 5 may be attached to the frame 9, and may have a reflecting surface in a reflecting relation with the beamsplitter 11. Preferably, the compensator 8 is disposed between the mirror 5 and the beamsplitter 11, and the optical assembly 200 is substantially stable regarding the reflective relationship between the mirror 5 and the beamsplitter 11.

Preferably, the outwardly facing (e.g., faces away from the inside or an interior space of the frame 9, faces away from the inside of the interferometer optical assembly 200, faces towards the retroreflector 152, etc.) reflecting surface 17 of the mirror 4 operates to reflect the beam 16 (e.g., from the retroreflector 152) and return the beam 16 (e.g., to retroreflector 152). Preferably, similar to the mirror 5, the outward facing mirror 4, and its three pins 12a, may be made of the same or CTE-similar material as the frame 9. As aforementioned, preferably, the outward facing reflecting mirror surface 17 is perpendicular to, or substantially perpendicular to, the beam 16 to achieve the desired optical result(s). The reflecting surface 17 of the mirror 4 and/or the mirror 4 may be attached to, suspend from, and/or be suspended by, the frame 9. Preferably, the reflecting surface 17 of the mirror 4 is in reflecting relation to the beamsplitter 11 through a retroreflector, such as the retroreflector 152.

Preferably, the first support member(s) 3a and the second support member(s) 3b each comprise at least one of the same material or materials having the identical or substantially the same coefficient of thermal expansion. In one preferred embodiment, support member(s) 3a and 3b are integrally formed, machined, cast, molded, etc. with plates 1 and 2, thereby forming a single part.

As best seen in FIGS. 5, 7-9 and 12-13, the protruding member 90 operates to allow the monolithic interferometer optical assembly 200 to be incorporated in one or more interferometers, such as the interferometer 100.

The retroreflector 152 may be made of fused quartz or fine annealed Pyrex (i.e., any type of borosilicate glass or glasses having a low coefficient of thermal expansion). As aforementioned, the retroreflector 152 is designed to receive an incoming (incident) light ray (such as beam 15 as shown in FIG. 6) and reflect the light ray off of its reflective surfaces and out from retroreflector 152 along a path (e.g., path of beam 16 as shown in FIG. 6) substantially parallel to the incident light ray. Of course, the incident light ray can initially strike any one of the reflective surfaces without bearing upon the accuracy of the parallelism of the reflected light ray. If maintaining/achieving high degrees of accuracy, i.e., parallelism of the incident and reflected light rays, is a primary purpose of retroreflector 152, then high degrees of precision must be created and maintained with respect to the flatness of and perpendicularity of such reflective surfaces.

Figure 15A:
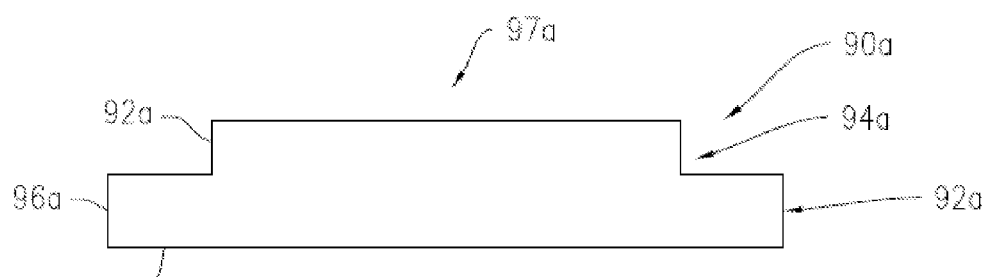
FIGS. 15A-15F are cross-sectional views taken along the diameter of various embodiments of the protruding member employing different geometrical shapes for the groove/relieved portion thereof in accordance with one or more embodiments of the present invention.
Figure 15B:
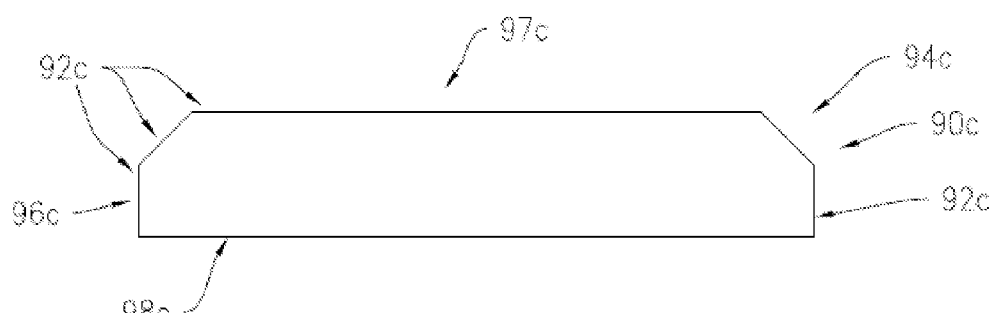
Figure 15C:
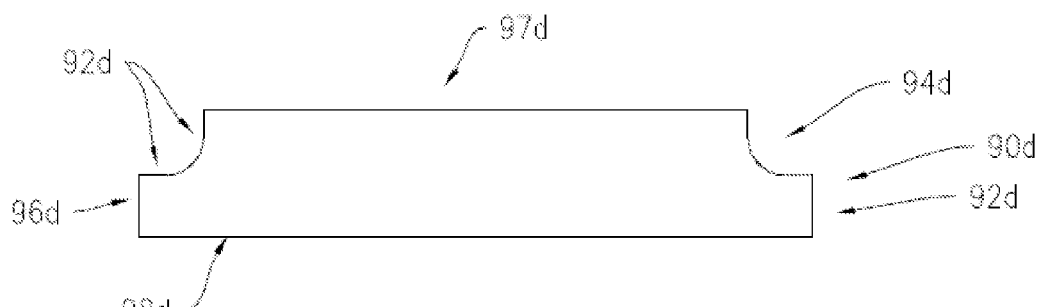
Figure 15D:
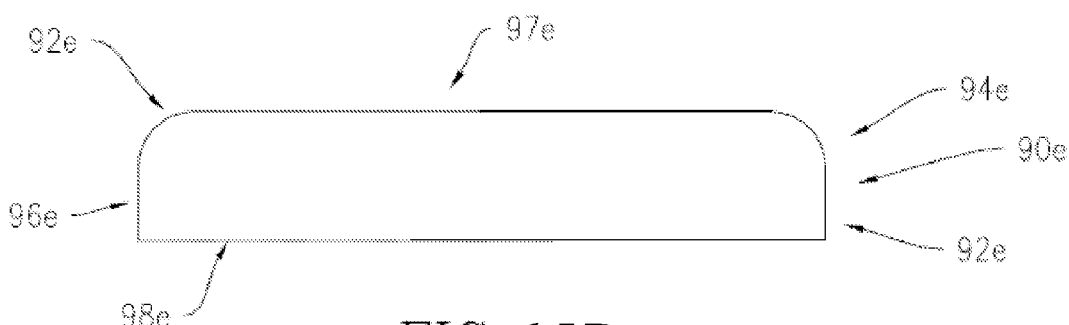
Figure 15E:
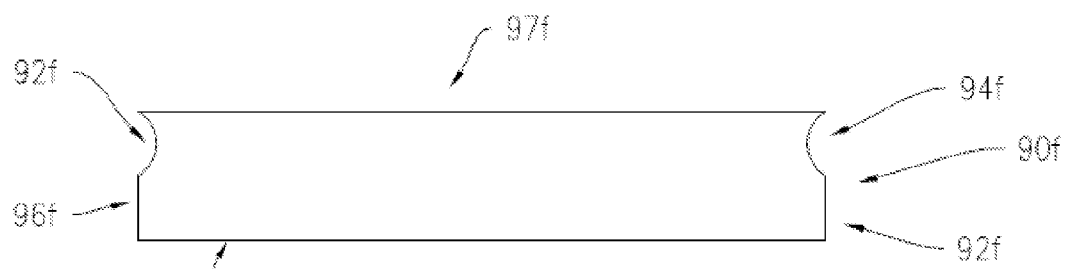
Figure 15F:
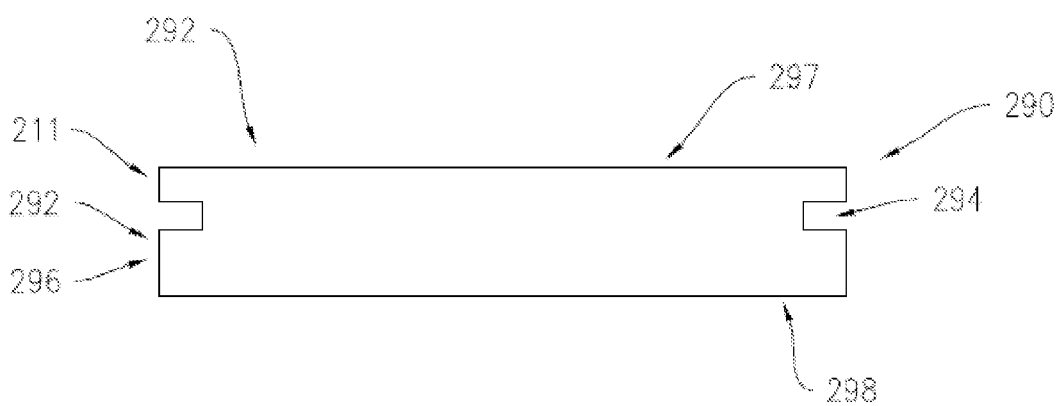

As best seen in FIGS. 12 and 15A-15F, the protruding member (e.g., the protruding member 90, 90a-90f, 290, etc.) may include one or more features discussed at length in co-pending U.S. patent application Ser. No. 13/036,506, filed on Feb. 28, 2011, to Bleier et al., the entirety of which is incorporated herein by reference, or may include one or more features discussed at length in U.S. Pat. No. 8,092,030, issued Jan. 10, 2012, to Bleier, the entirety of which is incorporated herein by reference. For example, the protruding member 90 (also may use alternative embodiments of protruding member 90, such as, but not limited to, protruding members 90a, 90b, 90c, 90d, 90e, 90f, 290, etc. as shown in FIGS. 15A-15F) may have a first portion (e.g., the first portion 97, 97a, 97b, 97c, 97d, 97e, 97f, 297, etc. as shown in FIGS. 12 and 15A-15F) extending from a surface of either the first plate 1 or the second plate 2 of the frame 9, a second portion (e.g., the second portion 96, 96a, 96b, 96c, 96d, 96e, 96f, 296, etc. as shown in FIGS. 12 and 15A-15F), and a groove (e.g., the groove 94, 94a, 94b, 94c, 94d, 94e, 94f, 294, etc. as shown in FIGS. 12 and 15A-15F) defining the first and second portions of the protruding member (e.g., the protruding member 90, 90a-90f, 290, etc.) on each side of the groove (e.g., the groove 94, 94a, 94b, 94c, 94d, 94e, 94f, 294, etc.), the groove (e.g., the groove 94, 94a, 94b, 94c, 94d, 94e, 94f, 294, etc.) of the protruding member (e.g., the protruding member 90, 90a-90f, 290, etc.) being constructed to dissipate and/or eliminate one or more stresses passing through the protruding member (e.g., the protruding member 90, 90a-90f, 290, etc.), thereby preventing the one or more stresses from affecting the interferometer optical assembly 200. At least one of the first (e.g., the first portion 97, 97a, 97b, 97c, 97d, 97e, 97f, 297, etc.) and said second portions (e.g., the second portion 96, 96a, 96b, 96c, 96d, 96e, 96f, 296, etc.) of said protruding member (e.g., the protruding member 90, 90a-90f, 290, etc.) is at least one of: having a substantially circular shape and being of any geometric shape. The first portion (e.g., the first portion 97, 97a, 97b, 97c, 97d, 97e, 97f, 297, etc.) of the protruding member (e.g., the protruding member 90, 90a-90f, 290, etc.) may be smaller (e.g., may have a smaller volume, have a smaller cross-section, have a small surface area, have smaller dimension(s), etc.) than the second portion (e.g., the second portion 96, 96a, 96b, 96c, 96d, 96e, 96f, 296, etc.) of the protruding member (e.g., the protruding member 90, 90a-90f, 290, etc.) The first portion (e.g., the first portion 97, 97a, 97b, 97c, 97d, 97e, 97f, 297, etc.) of the protruding member (e.g., the protruding member 90, 90a-90f, 290, etc.) may have a surface that is in contact with either the first plate 1 or the second plate 2 of the frame 9 and the surface of the first portion (e.g., the first portion 97, 97a, 97b, 97c, 97d, 97e, 97f, 297, etc.) of the protruding member (e.g., the protruding member 90, 90a-90f, 290, etc.) may have at least one of: a smaller diameter than a lateral cross-section and/or a bottom surface (e.g., 98, 98a-98a, 298, etc.) of the second portion (e.g., the second portion 96, 96a, 96b, 96c, 96d, 96e, 96f, 296, etc.) of the protruding member (e.g., the protruding member 90, 90a-90f, 290, etc.) that may be disposed in an opening of a mount that operates to secure the optical assembly 200 in place; and a smaller surface area than a lateral cross-section and/or a bottom surface (e.g., 98, 98a-98a, 298, etc.) of the second portion (e.g., the second portion 96, 96a, 96b, 96c, 96d, 96e, 96f, 296, etc.) that is disposed in the opening of the mount that operates to secure the optical assembly 200 in place. The protruding member (e.g., the protruding member 90, 90a-90f, 290, etc.) may be at least one of integrally formed with the surface of the first plate 1 or the second plate 2 of the frame 9; and bonded to the surface of the first plate 1 or the second plate 2 of the frame 9, the bonding being at least one of fusing and adhering. In at least one embodiment (best seen in FIG. 15F), a top portion 211 may be included to space the groove 294 away from the interferometer optical assembly 200. Preferably, one or more lateral cross-sections of the portion (e.g., top portion 211 as shown in FIG. 15F) of the protruding member 290 located between the groove 294 and the top surface 297 have a surface area and/or diameter that is substantially the same as the surface area and/or diameter of a lateral cross-section of the base portion 296 or of the bottom surface 298 of the member 290. While the volume of the portion (such as portion 211) may be any size, preferably, the volume of the portion (e.g., top portion 211 as shown in FIG. 15F) of the member 290 located between the groove 294 and the top surface 297 has a volume that is smaller than the volume of the bottom portion 296, 296a, 296b.

The groove (e.g., the groove 94, 94a, 94b, 94c, 94d, 94e, 94f, 294, etc.) may include one or more features discussed at length in co-pending U.S. patent application Ser. No. 13/036, 506, filed on Feb. 28, 2011, to Bleier et al., the entirety of which is incorporated herein by reference. For example, the groove (e.g., the groove 94, 94a, 94b, 94c, 94d, 94e, 94f, 294, etc.) may be at least one of: a space between the frame 9 and at least one of the second portion (e.g., the second portion 96, 96a, 96b, 96c, 96d, 96e, 96f, 296, etc.) of the protruding member (e.g., the protruding member 90, 90a-90f, 290, etc.) and the mount such that the frame 9 is spaced away from the at least one of the second portion (e.g., the second portion 96, 96a, 96b, 96c, 96d, 96e, 96f, 296, etc.) of the protruding member (e.g., the protruding member 90, 90a-90f, 290, etc.) and the mount; and operating to achieve and/or maintain at least one of: dimensional stability, a predetermined degree of flatness and a high degree of flatness of at least one of: about $\lambda/10$, about $\lambda/15$, about $\lambda/20$, about $\lambda/30$, between about $\lambda/10$ and about $\lambda/15$, between about $\lambda/10$ and about $\lambda/20$, between about $\lambda/10$ and about $\lambda/30$, between about $\lambda/15$ and about $\lambda/20$, between about $\lambda/15$ and about $\lambda/30$ and between about $\lambda/20$ and about $\lambda/30$. The groove of the protruding member (e.g., the protruding member 90, 90a-90f, 290, etc.) may extend along and/or in communication with a perimeter of the first portion (e.g., the first portion 97, 97a, 97b, 97c, 97d, 97e, 97f, 297, etc.) of the protruding member (e.g., the protruding member 90, 90a-90f, 290, etc.) and may at least one of: have a substantially circular shape; and be of any geometric shape. The groove (e.g., the groove 94, 94a, 94b, 94c, 94d, 94e, 94f, 294, etc.) of the protruding member (e.g., the protruding member 90, 90a-90f, 290, etc.) may include at least one of: one or more right angles, one or more slopes, one or more chamfered surfaces having a consistent slope, one or more chamfered surfaces having a changing convex slope, one or more chamfered surfaces having a changing concave slope, and one or more tapers. The groove (e.g., the groove 94, 94a, 94b, 94c, 94d, 94e, 94f, 294, etc.) may be formed at substantially a right angle such that the first portion (e.g., the first portion 97, 97a, 97b, 97c, 97d, 97e, 97f, 297, etc.) of an outer surface of the protruding member (e.g., the protruding member 90, 90a-90f, 290, etc.) extends from the second portion (e.g., the second portion 96, 96a, 96b, 96c, 96d, 96e, 96f, 296, etc.) of the protruding member (e.g., the protruding member 90, 90a-90f, 290, etc.) inwardly substantially parallel to the surface of the first portion (e.g., the first portion 97, 97a, 97b, 97c, 97d, 97e, 97f, 297, etc.) of the protruding member (e.g., the protruding member 90, 90a-90f, 290, etc.) and a second portion of the outer surface of the protruding member (e.g., the protruding member 90, 90a-90f, 290, etc.) extends from the first portion of the outer surface vertically substantially at a right angle and/or perpendicular to the surface of the first portion (e.g., the first portion 97, 97a, 97b, 97c, 97d, 97e, 97f, 297, etc.) of the protruding member (e.g., the protruding member 90, 90a-90f, 290, etc.).

The one or more stresses may include at least one of: connection and/or clamping stress resulting from clamping the protruding member (e.g., the protruding member 90, 90a-90f, 290, etc.) to the mount, stress passing through the mount, stress passing through the protruding member (e.g., the protruding member 90, 90a-90f, 290, etc.), sheer stress, rotational stress and stress resulting from one or more changes in temperature.

Additionally, as best seen in FIGS. 5, 7A, and 8-13, one or more embodiments of the optical assembly 200 and/or interferometer 100 may include one or more recesses 23 disposed on at least one of the first plate 1 and the second plate 2 of the frame 9. The one or more recesses 23 operate to dissipate heat from the frame 9. While the recesses 23 may be used with any material for any of the components of the optical assembly 200 and/or the interferometer 100, the high thermal diffusivity of the recesses 23 may preferably permit and/or aid the interaction between the aforementioned materials having different coefficients of thermal expansion. As shown in FIGS. 10-11 and 13, the one or more recesses 23 may be disposed on a plate, such as the first plate 1, and may extend for a predetermined distance along the length of the first plate 1. Alternatively or additionally, as best seen in FIGS. 7A, 8-9, and 12, the one or more recesses 23 or one or more other recesses 23 may be disposed on a plate, such as the second plate 2, and may extend for a predetermined distance along the width of the second plate 2. The one or more recesses 23 may be disposed on the first and/or second plates 1, 2 in any manner known to those skilled in the art, such as, but not limited to, etching, carving, molding, cutting, etc.

In accordance with at least a further aspect of the present invention, an interferometer 100 may include a radiation source (such as the radiation source 10, 110, etc.); a beamsplitter 11 having a first surface and a second surface, the beamsplitter 11 including at least one first material; a frame 9 having a first plate 1 and a second plate 2 having the beamsplitter 11 extending therebetween; a retroreflector (e.g., such as the retroreflector 152) disposed externally to the frame 9, the retroreflector (e.g., such as the retroreflector 152) operating to move relative to the frame 9; a first mirror 5 attached to the frame 9 and having a reflecting surface in a first direct reflecting relation with the beamsplitter 11; and a second mirror (e.g., the mirror surface 17) attached to the frame 9 and having a reflecting surface in a second direct reflecting relation with the retroreflector (e.g., such as the retroreflector 152). Preferably, the retroreflector (e.g., such as retroreflector 152) has a retroreflection relation with both the beamsplitter 11 and the second mirror (e.g., the mirror surface 17). Preferably, the frame 9 is made of at least a second material that is different from the at least one first material, and the at least one first material has a coefficient of thermal expansion that is identical to or substantially similar to a coefficient of thermal expansion of the at least second material such that the beamsplitter 11 has limited or no exposure to at least one of bending, warping, tilting and distorting. One or more aforementioned features of the interferometer optical assembly 200 may be incorporated into one or more embodiments of the interferometer 100 described herein.

The manner of mounting described herein is an improvement over prior mounting manners and is equally good, if not better, at preventing distortion of one or more optical components of the interferometer optical assembly 200 and/or the interferometer 100 as described herein. The method of mounting one or more components of the interferometer optical assembly 200 and/or the interferometer 100 as described herein achieves the advantage that one or more optical components of the assembly 200 and/or interferometer 100 have limited or no exposure to at least one of bending, warping, tilting and distorting. The method of mounting includes the steps of disposing a beamsplitter 11 having a first surface 71 and a second surface 72 in between a first plate 1 and a second plate 2 of a frame 9 such that the beamsplitter 11 extends between the first plate 1 and the second plate 2, the beamsplitter 11 comprising at least one first material, wherein (i) the frame includes at least a second material that is different from the at least one first material; and (ii) the at least one first material has a coefficient of thermal expansion that is identical to or substantially similar to a coefficient of thermal expansion of the at least second material such that the beamsplitter 11 has limited or no exposure to at least one of bending, warping, tilting and distorting. One or more structural features of the one or more components of the interferometer optical assembly 200 and/or the interferometer 100 may be incorporated into the method of mounting same. For example, preferably, the at least one first material includes Potassium Bromide ("KBr"), Calcium Fluoride ("CaF$_2$") and/or a material having a high CTE (e.g., having a CTE of at least one of: about 5 ppm/degree C.-about 10 ppm/degree C., about 10 ppm/degree C.-30 ppm/degree C., greater than 30 ppm/degree C., etc.), and the at least one second material includes at least one of Zinc, Aluminum, Magnesium, an Aluminum-Zinc or a Zinc-Aluminum alloy.

The method further includes kinematically mounting the beamsplitter 11 to the frame 9 using a beamsplitter securing apparatus comprising three pins 12a each having a first end and a second end. Preferably, the three pins 12a of the beamsplitter securing apparatus include at least the first material, e.g., Potassium Bromide ("KBr"), Calcium Fluoride ("CaF$_2$"), a material having a CTE of at least one of: about 5 ppm/degree C.-about 10 ppm/degree C., about 10 ppm/degree C.-30 ppm/degree C., and greater than 30 ppm/degree C., etc. The method may include disposing a bonding material on at least a periphery of each of the three pins 12a of the beamsplitter securing apparatus, the bonding material operating to bond the three pins 12*a* to the beamsplitter 11 and at least one of the first plate 1 and the second plate 2 of the frame 9. The method may further include: (i) having the beamsplitter 11 further include a third surface 6 and a fourth surface 7, the third surface 6 and the fourth surface 7 of the beamsplitter 11 extending between the first 71 and second 72 surfaces of the beamsplitter 11 on opposite ends of the beamsplitter 11; (ii) disposing the third surface 6 of the beamsplitter 11 against (or adjacent to) the first plate 1 of the frame 9; and (iii) disposing the fourth surface 7 of the beamsplitter 11 against (or adjacent to) the second plate 2 of the frame 9.

The method may further include having the beamsplitter 11 further include at least a first landing area 56 (which may substantially parallel to a surface, such as the surface 6; may be coplanar with a surface, such as the surface 6; may not be coplanar with, or may only be coplanar with, a portion of one or more surfaces of the one or more optical elements or components of the interferometer optical assembly 200; may be substantially parallel to a portion of one or more surfaces of the one or more optical elements or components of the interferometer optical assembly 200; etc.) on or against the third surface 6 of the beamsplitter 11 and at least a second landing area 56 and a third landing area 56 (which may be substantially parallel to a surface, such as the surface 7; may be coplanar with a surface, such as the surface 7; may not be coplanar with, or may only be coplanar with, a portion of one or more surfaces of the one or more optical elements or components of the interferometer optical assembly 200; may be substantially parallel to a portion of one or more surfaces of the one or more optical elements or components of the interferometer optical assembly 200; etc.) on or against the fourth surface 7 of the beamsplitter 11; disposing the first end of at least a first pin 12*a* of the three pins 12*a* of the beamsplitter securing apparatus onto or against the at least first landing area 56 of the beamsplitter 11; disposing the second end of the at least first pin 12*a* into a respective first hole 12*b* of the first plate 1 such that the at least first pin 12*a* of the three pins 12*a* of the beamsplitter securing apparatus operates to be disposed on or against the at least first landing area 56 of the beamsplitter 11 and in the first hole 12*b* of the first plate 1, thereby forming an attachment between the beamsplitter 11 and the first plate 1; disposing the first end of at least a second pin 12*a* of the three pins 12*a* of the beamsplitter securing apparatus onto or against the at least second landing area 56 of the beamsplitter 11; disposing the second end of the at least second pin 12*a* into a respective first hole 12*b* of the second plate 2 such that the at least second pin 12*a* of the three pins 12*a* of the beamsplitter securing apparatus operates to be disposed on or against the at least second landing area 56 of the beamsplitter 11 and in the first hole 12*b* of the second plate 2, thereby forming an attachment between the beamsplitter 11 and the second plate 2; disposing the first end of at least a third pin 12*a* of the three pins 12*a* of the beamsplitter securing apparatus on or against the at least third landing area 56 of the beamsplitter 11; and disposing the second end of the at least third pin 12*a* into a respective second hole 12*b* of the second plate 2 such that the at least third pin 12*a* of the three pins 12*a* of the beamsplitter securing apparatus operates to be disposed on or against the at least third landing area 56 of the beamsplitter 11 and in the second hole 12*b* of the second plate 2, thereby forming an attachment between the beamsplitter 11 and the second plate 2. The method may further include sizing and shaping the three pins 12*a* of the beamsplitter securing apparatus to fit within their respective holes 12*b* of the first 1 and/or second plates 2 of the frame 9 and to be disposed on or against the one or more landing areas 56 of the beamsplitter 11 such that the beamsplitter 11 is in substantial contact with, and/or is disposed substantially adjacent to, the first and second plates of the frame. The bonding material or shell 13 may be disposed on at least a periphery of each of the three pins 12*a* of the beamsplitter securing apparatus, the bonding material 13 operating to bond the three pins 12*a* of the beamsplitter securing apparatus to the beamsplitter 11 and at least one of the first plate 1 and the second plate 2 of the frame 9.

The method may further include disposing a compensator 8 inside/on/to the frame 9 and connecting the compensator 8 in the same or similar fashion to the way the beamsplitter 11 is connected or disposed in/on/to the frame 9 as described above. For example, a compensator securing apparatus having three pins 12*a* each having a first end and a second end may be used in the same or similar fashion as the beamsplitter securing apparatus to kinematically mount the compensator 8 to the frame 9. Preferably, the compensator 8 includes the at least one first material (e.g., KBr, CaF$_2$, a material having a CTE of at least one of: about 5 ppm/degree C.-about 10 ppm/degree C., about 10 ppm/degree C.-30 ppm/degree C., and greater than 30 ppm/degree C., etc.) such that the compensator 8 has limited or no exposure to at least one of bending, warping, tilting and distorting, and the three pins 12*a* of the compensator securing apparatus, preferably, include at least the first material, such as, but not limited to, Potassium Bromide, Calcium Fluoride, etc.

The bonding material or shell 13 may be disposed on at least a periphery of each of the three pins 12*a* of the compensator securing apparatus, the bonding material 13 operating to bond the three pins 12*a* of the compensator securing apparatus to the compensator 8 and at least one of the first plate 1 and the second plate 2 of the frame 9. The compensator 8 may further include a third surface 6 and a fourth surface 7, the third surface 6 and the fourth surface 7 of the compensator 8 extending between the first 73 and second 74 surfaces of the compensator 8 on opposite ends of the compensator 8, and the method may further include disposing the third surface 6 of the compensator 8 against or adjacent to the first plate 1 of the frame 9; and disposing the fourth surface 7 of the compensator 8 against or adjacent to the second plate 2 of the frame 9. The compensator 8 may further include at least a first landing area 56 (which may be coplanar with a surface, such as the surface 6; may be substantially parallel to a surface, such as the surface 6; may not be coplanar with, or may only be coplanar with, a portion of one or more surfaces of the one or more optical elements or components of the interferometer optical assembly 200; may be substantially parallel to a portion of one or more surfaces of the one or more optical elements or components of the interferometer optical assembly; etc.) on or against the third surface 6 of the compensator 8 and at least a second landing area 56 and a third landing area 56 (which may be substantially parallel to a surface, such as the surface 7; may be coplanar with a surface, such as the surface 7; may not be coplanar with, or may only be coplanar with, a portion of one or more surfaces of the one or more optical elements or components of the interferometer optical assembly 200; may be substantially parallel to a portion of one or more surfaces of the one or more optical elements or components of the interferometer optical assembly 200; etc.) in communication with the fourth surface 7 of the compensator 8, and the method may include disposing the first end of at least a first pin 12*a* of the three pins 12*a* of the compensator securing apparatus on or against the at least first landing area 56 of the compensator 8; disposing the second end of the at least first pin 12*a* of the three pins 12*a* of the compensator securing apparatus into a respective first hole 12*b* of the first plate 1 such that the at least first pin 12*a* of the three pins 12*a* of the compensator securing apparatus operates to be disposed on or against the at least first landing area 56 of the compensator 8 and in the first hole 12b of the first plate 1, thereby forming an attachment between the compensator 8 and the first plate 1; disposing the first end of at least a second pin 12a of the three pins 12a of the compensator securing apparatus on or against the at least second landing area 56 of the compensator 8; disposing the second end of the at least second pin 12a of the three pins 12a of the compensator securing apparatus into a respective first hole 12b of the second plate 2 such that the at least second pin 12a of the three pins 12a of the compensator securing apparatus operates to be disposed on or against the at least second landing area 56 of the compensator 8 and in the first hole 12b of the second plate 2, thereby forming an attachment between the compensator 8 and the second plate 2; disposing the first end of at least a third pin 12a of the three pins 12a of the compensator securing apparatus on or against the at least third landing area 56 of the compensator 8; and disposing the second end of the at least third pin 12a of the three pins 12a of the compensator securing apparatus into a respective second hole 12b of the second plate 2 such that the at least third pin 12a of the three pins 12a of the compensator securing apparatus operates to be disposed on or against the at least third landing area 56 of the compensator 8 and in the second hole 12b of the second plate 2, thereby forming an attachment between the compensator 8 and the second plate 2. The three pins 12a of the compensator securing apparatus may be sized and shaped to fit within their respective holes 12b of the first 1 and/or second 2 plates of the frame 9 and on or against the one or more landing areas 56 of the compensator 8 such that the compensator 8 is in substantial contact with, and/or is disposed substantially adjacent to, the first 1 and second 2 plates of the frame 9.

The method may further include at least one of bonding a first support member 3a between a first portion of the first plate 1 and a first portion of the second plate 2; and bonding a second support member 3b between a second portion of the first plate 1 and a second portion of the second plate 2. The first support member 3a and the second support member 3b may each include at least one of the same material or materials having the identical or substantially the same coefficient of thermal expansion. In at least one embodiment, there may be a plurality of the first support members 3a and/or second support members 3b.

The method may further include attaching a mirror 5 to the frame 9 such that the mirror 5 has a reflecting surface in a reflecting relation with the beamsplitter 11, wherein the compensator 8 is disposed between the mirror 5 and the beamsplitter 11 and the optical assembly 200 is substantially stable regarding the reflective relationship between the mirror 5 and the beamsplitter 11. One may further at least one of: (i) attach a second mirror (e.g., the mirror 4, and/or a portion of the mirror 4, such as, but not limited to, the reflecting surface 17 of the mirror 4) to the frame 9 such that the second mirror 4 has a reflecting surface 17 facing away from an interior space of the frame 9, and the reflecting surface 17 of the mirror 4 is in reflecting relation to the beamsplitter 11 through a retroreflector (e.g., the retroreflector 152); and (ii) dispose a protruding member 90 (or 90a-90f, 290, etc.) on the frame 9 such that the protruding member 90 (or 90a-90f, 290, etc.) has a first portion extending from a surface of either the first plate 1 or the second plate 2 of the frame 9, a second portion 96 (or 96a-96f, 296, etc.), and a groove 94 (or 94a-94f, 294, etc.) defining the first 97 (or 97a-97f, 297, etc.) and second 96 (or 96a-96f, 296, etc.) portions of the protruding member 90 (or 90a-90f, 290, etc.) on each side of the groove 94 (or 94a-94f, 294, etc.), the groove 94 (or 94a-94f, 294, etc.) of the protruding member 90 (or 90a-90f, 290, etc.) being constructed to dissipate and/or eliminate one or more stresses passing through the protruding member 90 (or 90a-90f, 290, etc.), thereby preventing the one or more stresses from affecting the optical assembly 200.

Additionally, one may align one or more of the first plate 1, the second plate 2, the first support member 3a, the second support member 3b, the mirror 5, the second mirror 4 and/or the reflecting surface 17 of the mirror 4, the beamsplitter 11, the compensator 8, the three pins 12a of the beamsplitter securing apparatus and the three pins 12a of the compensator securing apparatus before locking the alignment in place with at least one of friction, fusing (or adhering), adhesive force(s) and bonding.

It will also be seen that the manner of mounting described herein achieves substantial rigidity between the components of the interferometer 100, including the interferometer optical assembly 200.

The present invention also may be used in conjunction with any suitable optical assembly including, but not limited to, optical assembly structures, interferometers, and/or retroreflectors such as those disclosed in U.S. Pat. Nos. 5,335,111; 5,949,543; 6,141,101; 6,473,185; 6,729,735; 6,752,503; 6,786,608; 6,827,455; 6,945,661; 7,168,817; 7,995,208; 8,092,030 to Bleier; U.S. Pat. No. 7,268,960 to Vishnia; and U.S. application Ser. No. 12/505,279, filed on Jul. 17, 2009, (presently pending), and Ser. No. 13/036,506, filed on Feb. 28, 2011, (presently pending), each of which patents and applications are incorporated by reference herein in their entireties. One construction for a hollow retroreflector is as disclosed in U.S. Pat. No. 3,663,084 to Morton S. Lipkins.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

What is claimed is:

1. An optical assembly for use with a precision instrument, comprising:

a beamsplitter having a first surface, a second surface, a third surface and a fourth surface, the third surface extending between the first and second surfaces and having a first landing area thereon, and the fourth surface extending between the first and second surfaces and having a second landing area and a third landing area thereon, the beamsplitter comprising at least one first material;

a frame comprising a first plate and a second plate, the first plate being disposed adjacent to the third surface of the beamsplitter and the second plate being disposed adjacent to the fourth surface of the beamsplitter, thereby having the beamsplitter extend between the first and second plates, the first plate including a first hole which faces the first landing area and the second plate including a second hole which faces the second landing area and a third hole which faces the third landing area; and a beamsplitter securing apparatus comprising three pins each having a first end and a second end, the three pins operating to kinematically mount the beamsplitter to the frame, wherein:

the first landing area is configured to receive a first pin of the three pins of the beamsplitter securing apparatus thereon or thereagainst and to align with the corresponding first hole of the first plate such that the first pin is disposed in the first hole of the first plate, thereby forming an attachment between the beamsplitter and the first plate, the second landing area is configured to receive a second pin of the three pins of the beamsplitter securing apparatus thereon or thereagainst and to align with the corresponding second hole of the second plate such that the second pin is disposed in the second hole of the second plate, thereby forming an attachment between the beamsplitter and the second plate, the third landing area is configured to receive a third pin of the three pins of the beamsplitter securing apparatus thereon or thereagainst and to align with the corresponding third hole of the second plate such that the third pin is disposed in the third hole of the second plate, thereby forming an attachment between the beamsplitter and the second plate, the frame comprises at least a second material that is different from the at least one first material; and the at least one first material has a coefficient of thermal expansion that is at least one of identical to, substantially similar to, and as close as practicable to a coefficient of thermal expansion of the at least second material such that the beamsplitter has limited or no exposure to at least one of bending, warping, tilting and distorting.

2. The optical assembly of claim 1, wherein:
(i) the at least one first material comprises at least one of: Potassium Bromide ("KBr"), Calcium Fluoride ("CaF$_2$"), and a material having a CTE of at least one of: about 5 ppm/degree C.-about 10 ppm/degree C., about 10 ppm/degree C.-30 ppm/degree C., and greater than 30 ppm/degree C.; and
the at least one second material comprises at least one of Zinc, Aluminum, Magnesium, an Aluminum-Zinc or a Zinc-Aluminum alloy.

3. The optical assembly of claim 2, further comprising one or more recesses disposed on a surface of at least one of the first plate of the frame and the second plate of the frame, the one or more recesses operating to dissipate heat.

4. The optical assembly of claim 1, wherein the three pins of the beamsplitter securing apparatus at least one of: (i) each comprise the at least one first material comprising at least one of: Potassium Bromide ("KBr"), Calcium Fluoride ("CaF$_2$"), and a material having a CTE of at least one of: about 5 ppm/degree C.-about 10 ppm/degree C., about 10 ppm/degree C.-30 ppm/degree C., and greater than 30 ppm/degree C.; and (ii) each include bonding material on at least a periphery thereof.

5. The optical assembly of claim 1, wherein at least one of:
(i) at least one of the at least first landing area, the at least second landing area and the at least third landing area is at least one of: coplanar, coplanar with the third surface of the beamsplitter, not coplanar, not coplanar with the third surface of the beamsplitter, coplanar with the fourth surface of the beamsplitter, not coplanar with the fourth surface of the beamsplitter, coplanar with one or more surfaces of the beamsplitter, not coplanar with one or more surfaces of the beamsplitter, substantially parallel with the third surface of the beamsplitter, substantially parallel with the fourth surface of the beamsplitter, and substantially parallel with one or more surfaces of the beamsplitter; and
(ii) the three pins of the beamsplitter securing apparatus are sized and shaped to fit within their respective holes of the first and/or second plates of the frame and to be disposed on or against, and whose ends contact, their respective landing areas of the beamsplitter such that the beamsplitter is in substantial contact with, and/or is disposed substantially adjacent to, the first and second plates of the frame.

6. The optical assembly of claim 5, further comprising:
a compensator having a first surface and a second surface, the compensator extending between the first plate and the second plate, and the compensator comprising the at least one first material such that the compensator has limited or no exposure to at least one of bending, warping, tilting and distorting; and
a compensator securing apparatus comprising three pins each having a first end and a second end, the three pins operating to kinematically mount the compensator to the frame.

7. The optical assembly of claim 6, wherein the three pins of the compensator securing apparatus at least one of: (i) each comprise the at least one first material comprising at least one of: Potassium Bromide ("KBr"), Calcium Fluoride ("CaF$_2$"), and a material having a CTE of at least one of: about 5 ppm/degree C.-about 10 ppm/degree C., about 10 ppm/degree C.-30 ppm/degree C., and greater than 30 ppm/degree C.; and (ii) each include bonding material on at least a periphery thereof.

8. The optical assembly of claim 7, wherein the compensator further comprises a third surface and a fourth surface, the third surface of the compensator extending between the first and second surfaces of the compensator and operating to be disposed against or adjacent to the first plate of the frame, and the fourth surface of the compensator extending between the first and second surfaces of the compensator and operating to be disposed against or adjacent to the second plate of the frame.

9. The optical assembly of claim 8, wherein the compensator further comprises:
(i) at least a first landing area on or against the third surface of the compensator, the at least first landing area operating to receive at least a first pin of the three pins of the compensator securing apparatus thereon or thereagainst and to align with a respective first hole of the first plate such that the at least first pin of the three pins of the compensator securing apparatus operates to also be disposed in the first hole of the first plate, thereby forming an attachment between the compensator and the first plate; and
(ii) at least a second landing area and at least a third landing area on or against the fourth surface of the compensator, the at least second landing area operating to receive at least a second pin of the three pins of the compensator securing apparatus thereon or thereagainst and to align with a respective first hole of the second plate such that the at least second pin of the three pins of the compensator securing apparatus operates to also be disposed in the first hole of the second plate, thereby forming an attachment between the compensator and the second plate, and the at least third landing area operating to receive at least a third pin of the three pins of the compensator securing apparatus thereon or thereagainst and to align with a respective second hole of the second plate such that the at least third pin of the three pins of the compensator securing apparatus operates to also be disposed in the second hole of the second plate, thereby forming an attachment between the compensator and the second plate.

10. The optical assembly of claim 9, wherein at least one of:
  (i) at least one of the at least first landing area, the at least second landing area and the at least third landing area of the compensator is at least one of: coplanar, coplanar with the third surface of the compensator, not coplanar, not coplanar with the third surface of the compensator, coplanar with the fourth surface of the compensator, not coplanar with the fourth surface of the compensator, coplanar with one or more surfaces of the compensator, not coplanar with one or more surfaces of the compensator, substantially parallel with the third surface of the compensator, substantially parallel with the fourth surface of the compensator, and substantially parallel with one or more surfaces of the compensator; and
  (ii) the three pins of the compensator securing apparatus are sized and shaped to fit within their respective holes of the first and/or second plates of the frame and to be disposed on or against, and whose ends contact, their respective landing areas of the compensator such that the compensator is in substantial contact with, and/or is disposed substantially adjacent to, the first and second plates of the frame.

11. The optical assembly of claim 10, further comprising at least one of:
  (i) a first support member bonded between a first portion of the first plate and a first portion of the second plate, and/or a second support member bonded between a second portion of the first plate and a second portion of the second plate; and
  (ii) a first support member disposed between a first portion of the first plate and a first portion of the second plate and a second support member disposed between a second portion of the first plate and a second portion of the second plate, the first and second support members being integrally formed with the first plate and the second plate, thereby forming a single part.

12. The optical assembly of claim 11, wherein the first support member and the second support member each comprise at least one of the same material or materials having one or more coefficients of thermal expansion that are at least one of identical, substantially the same, practicably the same, and as close as practicable to each other.

13. The optical assembly of claim 12, further comprising a mirror attached to the frame, the mirror having a reflecting surface in a reflecting relation with the beamsplitter, wherein the compensator is disposed between the mirror and the beamsplitter and the optical assembly is substantially stable regarding the reflective relationship between the mirror and the beamsplitter.

14. The optical assembly of claim 13, further comprising a second mirror attached to the frame, the second mirror having a reflecting surface facing away from an interior space of the frame, the second mirror being in reflecting relation to the beamsplitter through a retroreflector, wherein at least one of: (i) the frame includes at least another hole that operates to receive at least one additional pin therein; (ii) the mirror and the second mirror each include at least one landing area that operates to receive the at least one additional pin thereon or thereagainst, thereby creating respective attachments between the frame and the mirror and the second mirror when the at least one additional pin is disposed in the at least another hole of the frame and is disposed on or against the at least one landing area of the mirror and/or the at least one landing area of the second mirror; (iii) the at least one additional pin comprises the same material as the material used for at least one of the frame, the mirror and the second mirror; and (iv) the mirror and the second mirror are made of at least one of: the same material as each other but different from the frame, the same material as the frame, and the same material as the frame and each other.

15. The optical assembly of claim 14, further comprising a protruding member having a first portion extending from a surface of either the first plate or the second plate of the frame, a second portion, and a groove defining the first and second portions of the protruding member on each side of the groove, the groove of the protruding member being constructed to dissipate and/or eliminate one or more stresses passing through the protruding member, thereby preventing the one or more stresses from affecting the optical assembly.

16. The optical assembly of claim 15, wherein at least one of:
  (i) at least one of the first and said second portions of said protruding member is at least one of: having a substantially circular shape and being of any geometric shape;
  (ii) the first portion of the protruding member is smaller than the second portion of the protruding member;
  (iii) the first portion of the protruding member has a surface that is in contact with either the first plate or the second plate of the frame and the surface of the first portion of the protruding member has at least one of: a smaller diameter than a lateral cross-section and/or a bottom surface of the second portion of the protruding member that is disposed in an opening of a mount that operates to secure the optical assembly in place; and a smaller surface area than a lateral cross-section and/or a bottom surface of the second portion that is disposed in the opening of the mount that operates to secure the optical assembly in place;
  (iv) the first portion of the protruding member has a smaller volume than the second portion of the protruding member;
  (v) the groove is at least one of: a space between the frame and at least one of the second portion of the protruding member and the mount such that the frame is spaced away from the at least one of the second portion of the protruding member and the mount; and operating to achieve and/or maintain at least one of: dimensional stability, a predetermined degree of flatness and a high degree of flatness of at least one of: about $\lambda/10$, about $\lambda/15$, about $\lambda/20$, about $\lambda/30$, between about $\lambda/10$ and about $\lambda/15$, between about $\lambda/10$ and about $\lambda/20$, between about $\lambda/10$ and about $\lambda/30$, between about $\lambda/15$ and about $\lambda/20$, between about $\lambda/15$ and about $\lambda/30$ and between about $\lambda/20$ and about $\lambda/30$;
  (vi) the protruding member is at least one of integrally formed with the surface of the first plate or the second plate; and bonded to the surface of the first plate or the second plate, the bonding being at least one of fusing and adhering;
  (vii) the groove of the protruding member extends along and/or in communication with a perimeter of the first portion of the protruding member and is at least one of: having a substantially circular shape; and being of any geometric shape;
  (viii) the groove of the protruding member includes at least one of: one or more right angles, one or more slopes, one or more chamfered surfaces having a consistent slope, one or more chamfered surfaces having a changing convex slope, one or more chamfered surfaces having a changing concave slope, and one or more tapers;
  (ix) the groove is formed at substantially a right angle such that a first portion of an outer surface of the protruding member extends from the second portion of the protruding member inwardly substantially parallel to the surface of the first portion of the protruding member and a second portion of the outer surface of the protruding member extends from the first portion of the outer surface vertically substantially at a right angle and/or perpendicular to the surface of the first portion of the protruding member; and (x) the one or more stresses comprises at least one of: connection and/or clamping stress resulting from clamping the protruding member to the mount, stress passing through the mount, stress passing through the protruding member, sheer stress, rotational stress, and stress resulting from one or more changes in temperature.

17. The optical assembly of claim 1, further comprising one or more recesses disposed on a surface of at least one of the first plate of the frame and the second plate of the frame, the one or more recesses operating to dissipate heat.

18. An interferometer comprising:
a radiation source;
a beamsplitter having a first surface, a second surface, a third surface and a fourth surface, the third surface extending between the first and second surfaces and having a first landing area thereon, and the fourth surface extending between the first and second surfaces and having a second landing area and a third landing area thereon, the beamsplitter comprising at least one first material;
a frame comprising a first plate and a second plate, the first plate being disposed adjacent to the third surface of the beamsplitter and the second plate being disposed adjacent to the fourth surface of the beamsplitter, thereby having the beamsplitter extend between the first and second plates, the first plate including a first hole which faces the first landing area and the second plate including a second hole which faces the second landing area and a third hole which faces the third landing area;
a beamsplitter securing apparatus comprising three pins each having a first end and a second end, the three pins operating to kinematically mount the beamsplitter to the frame, wherein the first landing area is configured to receive a first pin of the three pins and to align with the corresponding first hole of the first plate such that the first pin is disposed in the first hole of the first plate, thereby forming an attachment between the beamsplitter and the first plate, the second landing area is configured to receive a second pin of the three pins and to align with the corresponding second hole of the second plate such that the second pin is disposed in the second hole of the second plate, thereby forming an attachment between the beamsplitter and the second plate, and the third landing area is configured to receive a third pin of the three pins and to align with the corresponding third hole of the second plate such that the third pin is disposed in the third hole of the second plate, thereby forming an attachment between the beamsplitter and the second plate;
a retroreflector disposed externally to the frame, the retroreflector operating to move relative to the frame;
a first mirror attached to the frame and having a reflecting surface in a first direct reflecting relation with the beamsplitter; and
a second mirror attached to the frame and having a reflecting surface in a second direct reflecting relation with the retroreflector, wherein:
the retroreflector has a retroreflection relation with both the beamsplitter and the second mirror; the frame comprises at least a second material that is different from the at least one first material; and the at least one first material has a coefficient of thermal expansion that is at least one of identical to, substantially similar to, and as close as practicable to a coefficient of thermal expansion of the at least second material such that the beamsplitter has limited or no exposure to at least one of bending, warping, tilting and distorting.

19. The interferometer of claim 18, wherein at least one of:
(i) the at least one first material comprises at least one of: Potassium Bromide ("KBr"), Calcium Fluoride ("CaF$_2$"), and a material having a CTE of at least one of: about 5 ppm/degree C.-about 10 ppm/degree C., about 10 ppm/degree C.-30 ppm/degree C., and greater than 30 ppm/degree C.; and the at least one second material comprises at least one of Zinc, Aluminum, Magnesium, an Aluminum-Zinc or a Zinc-Aluminum alloy;
(ii) the three pins of the beamsplitter securing apparatus at least one of: each comprise at least one of: Potassium Bromide ("KBr"), Calcium Fluoride ("CaF$_2$"), and a material having a CTE of at least one of: about 5 ppm/degree C.-about 10 ppm/degree C., about 10 ppm/degree C.-30 ppm/degree C., and greater than 30 ppm/degree C.; and each include bonding material on at least a periphery thereof;
(vi) the three pins of the beamsplitter securing apparatus are sized and shaped to fit within their respective holes of the first and/or second plates of the frame and to be disposed on or against, and whose ends contact, their respective landing areas of the beamsplitter such that the beamsplitter is in substantial contact with, and/or is disposed substantially adjacent to, the first and second plates of the frame;
(vii) at least one of the first landing area, the second landing area and the third landing area is at least one of: coplanar, coplanar with the third surface of the beamsplitter, not coplanar, not coplanar with the third surface of the beamsplitter, coplanar with the fourth surface of the beamsplitter, not coplanar with the fourth surface of the beamsplitter, coplanar with one or more surfaces of the beamsplitter, not coplanar with one or more surfaces of the beamsplitter, substantially parallel with the third surface of the beamsplitter, substantially parallel with the fourth surface of the beamsplitter, and substantially parallel with one or more surfaces of the beamsplitter;
(viii) at least one of: the frame includes at least another hole that operates to receive at least one additional pin therein; the mirror and the second mirror each include at least one landing area that operates to receive the at least one additional pin thereon or thereagainst, thereby creating respective attachments between the frame and the mirror and the second mirror when the at least one additional pin is disposed in the at least another hole of the frame and is disposed on or against the at least one landing area of the mirror and/or the at least one landing area of the second mirror; the at least one additional pin comprises the same material as the material used for at least one of the frame, the mirror and the second mirror; and the mirror and the second mirror are made of at least one of: the same material as each other, the same material as the frame and the same material as the frame and each other; and
(ix) the frame further comprises one or more recesses disposed on a surface of at least one of the first plate of the frame and the second plate of the frame, the one or more recesses operating to dissipate heat.

20. The interferometer of claim 19, further comprising:
a compensator having a first surface and a second surface, the compensator extending between the first plate and the second plate, and the compensator comprising the at least one first material such that the compensator has limited or no exposure to at least one of bending, warping, tilting and distorting; and
a compensator securing apparatus comprising three pins each having a first end and a second end, the three pins operating to kinematically mount the compensator to the frame.

21. The interferometer of claim 20, wherein at least one of:
(i) the three pins of the compensator securing apparatus at least one of: each comprise at least one of: Potassium Bromide ("KBr"), Calcium Fluoride ("CaF$_2$"), and a material having a CTE of at least one of: about 5 ppm/degree C.-about 10 ppm/degree C., about 10 ppm/degree C.-30 ppm/degree C., and greater than 30 ppm/degree C.; and each include bonding material on at least a periphery thereof;
(ii) the compensator further comprises a third surface and a fourth surface, the third surface of the compensator extending between the first and second surfaces of the compensator and operating to be disposed against or adjacent to the first plate of the frame and the fourth surface of the compensator extending between the first and second surfaces of the compensator and operating to be disposed against or adjacent to the second plate of the frame;
(iii) the compensator further comprises:
at least a first landing area on or against the third surface of the compensator, the at least first landing area operating to receive at least a first pin of the three pins of the compensator securing apparatus thereon or thereagainst and to align with a respective first hole of the first plate such that the at least first pin of the three pins of the compensator securing apparatus operates to also be disposed in the first hole of the first plate, thereby forming an attachment between the compensator and the first plate; and
at least a second landing area and at least a third landing area on or against the fourth surface of the compensator, the at least second landing area operating to receive at least a second pin of the three pins of the compensator securing apparatus thereon or thereagainst and to align with a respective first hole of the second plate such that the at least second pin of the three pins of the compensator securing apparatus operates to also be disposed in the first hole of the second plate, thereby forming an attachment between the compensator and the second plate, and the at least third landing area operating to receive at least a third pin of the three pins of the compensator securing apparatus thereon or thereagainst and to align with a respective second hole of the second plate such that the at least third pin of the three pins of the compensator securing apparatus operates to also be disposed in the second hole of the second plate, thereby forming an attachment between the compensator and the second plate;
(iv) the three pins of the compensator securing apparatus are sized and shaped to fit within their respective holes of the frame and to be disposed on or against, and whose ends contact, their respective landing areas of the compensator such that the compensator is in substantial contact with, and/or is disposed substantially adjacent to, the first and second plates;
(v) the interferometer further comprises at least one of:
a first support member bonded between a first portion of the first plate and a first portion of the second plate and/or a second support member bonded between a second portion of the first plate and a second portion of the second plate; and
a first support member disposed between a first portion of the first plate and a first portion of the second plate and a second support member disposed between a second portion of the first plate and a second portion of the second plate, the first and second support members being integrally formed with the first plate and the second plate, thereby forming a single part;
(vi) the first support member and the second support member each comprise at least one of the same material or materials having one or more coefficients of thermal expansion that are at least one of identical, substantially the same, practicably the same, and as close as practicable to each other;
(vii) the compensator is disposed between the first mirror and the beamsplitter and the interferometer is substantially stable regarding the reflective relationship between the mirror and the beamsplitter;
(viii) the frame further comprises a protruding member having a first portion extending from a surface of either the first plate or the second plate of the frame, a second portion, and a groove defining the first and second portions of the protruding member on each side of the groove, the groove of the protruding member being constructed to dissipate and/or eliminate one or more stresses passing through the protruding member, thereby preventing the one or more stresses from affecting the optical assembly; and
(ix) at least one of the at least first landing area, the at least second landing area and the at least third landing area of the compensator is at least one of: coplanar, coplanar with the third surface of the compensator, not coplanar, not coplanar with the third surface of the compensator, coplanar with the fourth surface of the compensator, not coplanar with the fourth surface of the compensator, coplanar with one or more surfaces of the compensator, not coplanar with one or more surfaces of the compensator, substantially parallel with the third surface of the compensator, substantially parallel with the fourth surface of the compensator, and substantially parallel with one or more surfaces of the compensator.

22. A method of mounting one or more components of an interferometer and/or interferometer optical assembly, comprising the steps of:
disposing a beamsplitter in between a first plate and a second plate of a frame such that the beamsplitter extends between the first plate and the second plate, the beamsplitter comprising at least one first material and having a first surface, a second surface, a third surface and a fourth surface, the third surface extending between the first and second surfaces and having a first landing area thereon, and the fourth surface extending between the first and second surfaces and having a second landing area and a third landing area thereon, the first plate of the frame being disposed adjacent to the third surface of the beamsplitter and the second plate of the frame being disposed adjacent to the fourth surface of the beamsplitter, the first plate including a first hole which faces the first landing area and the second plate including a second hole which faces the second landing area and a third hole which faces the third landing area;

kinematically mounting the beamsplitter to the frame using a beamsplitter securing apparatus comprising three pins each having a first end and a second end by disposing the first end of a first pin of the three pins on or against the first landing area of the beamsplitter and disposing the second end of the first pin into the corresponding first hole of the first plate, disposing the first end of a second pin of the three pins on or against the second landing area of the beamsplitter and disposing the second end of the second pin into the corresponding second hole of the second plate, and disposing the first end of a third pin of the three pins on or against the third landing area of the beamsplitter and disposing the second end of the third pin into the corresponding third hole of the second plate, wherein (i) the frame comprises at least a second material that is different from the at least one first material; and (ii) the at least one first material has a coefficient of thermal expansion that is at least one of identical to, substantially similar to, and as close as practicable to a coefficient of thermal expansion of the at least second material such that the beamsplitter has limited or no exposure to at least one of bending, warping, tilting and distorting.

23. The method of claim 22, wherein:
the at least one first material comprises at least one of: Potassium Bromide ("KBr"), Calcium Fluoride ("CaF$_2$"), and a material having a CTE of at least one of: about 5 ppm/degree C.-about 10 ppm/degree C., about 10 ppm/degree C.-30 ppm/degree C., and greater than 30 ppm/degree C.; and
the at least one second material comprises at least one of Zinc, Aluminum, Magnesium, an Aluminum-Zinc or a Zinc-Aluminum alloy.

24. The method of claim 23, further comprising
disposing one or more recesses on a surface of at least one of the first plate and the second plate, the one or more recesses operating to dissipate heat.

25. The method of claim 24, further comprising at least one of: (i) having the three pins of the beamsplitter securing apparatus include the at least one first material comprising at least one of: Potassium Bromide ("KBr"), Calcium Fluoride ("CaF$_2$"), and a material having a CTE of at least one of: about 5 ppm/degree C.-about 10 ppm/degree C., about 10 ppm/degree C.-30 ppm/degree C., and greater than 30 ppm/degree C.; and (ii) disposing a bonding material on at least a periphery of each of the three pins of the beamsplitter securing apparatus, the bonding material operating to bond the three pins to the beamsplitter and at least one of the first plate and the second plate of the frame.

26. The method of claim 22, further comprising at least one of:
(i) disposing at least one of the first landing area, the second landing area and the third landing area of the beamsplitter to be at least one of: coplanar, coplanar with the third surface of the beamsplitter, not coplanar, not coplanar with the third surface of the beamsplitter, coplanar with the fourth surface of the beamsplitter, not coplanar with the fourth surface of the beamsplitter, coplanar with one or more surfaces of the beamsplitter, not coplanar with one or more surfaces of the beamsplitter, substantially parallel with the third surface of the beamsplitter, substantially parallel with the fourth surface of the beamsplitter, and substantially parallel with one or more surfaces of the beamsplitter; and
(ii) sizing and shaping the three pins of the beamsplitter securing apparatus to fit within their respective holes of the first and second plates of the frame and on or against their corresponding landing areas of the beamsplitter such that the beamsplitter is in substantial contact with, and/or is disposed substantially adjacent to, the first and second plates of the frame.

27. The method of claim 26, further comprising:
disposing a compensator having a first surface and a second surface inside the frame such that the compensator extends between the first plate and the second plate, the compensator comprising the at least one first material such that the compensator has limited or no exposure to at least one of bending, warping, tilting and distorting; and
providing a compensator securing apparatus comprising three pins each having a first end and a second end, the three pins operating to kinematically mount the compensator to the frame.

28. The method of claim 27, further comprising at least one of: (i) having the three pins of the compensator securing apparatus include at least one of: Potassium Bromide ("KBr"), Calcium Fluoride ("CaF$_2$"), and a material having a CTE of at least one of: about 5 ppm/degree C.-about 10 ppm/degree C., about 10 ppm/degree C.-30 ppm/degree C., and greater than 30 ppm/degree C.; and (ii) disposing a bonding material on at least a periphery of each of the three pins of the compensator securing apparatus, the bonding material operating to bond the three pins of the compensator securing apparatus to the compensator and at least one of the first plate and the second plate of the frame.

29. The method of claim 28, further comprising:
having the compensator further include a third surface and a fourth surface, the third surface and the fourth surface of the compensator extending between the first and second surfaces of the compensator on opposite ends of the compensator;
disposing the third surface of the compensator against or adjacent to the first plate of the frame; and
disposing the fourth surface of the compensator against or adjacent to the second plate of the frame.

30. The method of claim 29, further comprising:
having the compensator further comprise at least a first landing area or surface on or against the third surface of the compensator and at least a second landing area or surface and at least a third landing area or surface on or against the fourth surface of the compensator;
disposing the first end of at least a first pin of the three pins of the compensator securing apparatus on or against the at least first landing area or surface of the compensator;
disposing the second end of the at least first pin of the three pins of the compensator securing apparatus into a respective first hole of the first plate such that the at least first pin of the three pins of the compensator securing apparatus operates to be disposed on or against the at least first landing area or surface of the compensator and in the first hole of the first plate, thereby forming an attachment between the compensator and the first plate;
disposing the first end of at least a second pin of the three pins of the compensator securing apparatus on or against the at least second landing area or surface of the compensator;
disposing the second end of the at least second pin of the three pins of the compensator securing apparatus into a respective first hole of the second plate such that the at least second pin of the three pins of the compensator securing apparatus operates to be disposed on or against the at least second landing area or surface of the compensator and in the first hole of the second plate, thereby forming an attachment between the compensator and the second plate;

disposing the first end of at least a third pin of the three pins of the compensator securing apparatus on or against the at least third landing area or surface of the compensator; and disposing the second end of the at least third pin of the three pins of the compensator securing apparatus into a respective second hole of the second plate such that the at least third pin of the three pins of the compensator securing apparatus operates to be disposed on or against the at least third landing area or surface of the compensator and in the second hole of the second plate, thereby forming an attachment between the compensator and the second plate.

31. The method of claim 30, further comprising at least one of:

(i) disposing at least one of the at least first landing area, the at least second landing area and the at least third landing area of the compensator to be at least one of: coplanar, coplanar with the third surface of the compensator, not coplanar, not coplanar with the third surface of the compensator, coplanar with the fourth surface of the compensator, not coplanar with the fourth surface of the compensator, coplanar with one or more surfaces of the compensator, not coplanar with one or more surfaces of the compensator, substantially parallel with the third surface of the compensator, substantially parallel with the fourth surface of the compensator, and substantially parallel with one or more surfaces of the compensator; and (ii) sizing and shaping the three pins of the compensator securing apparatus to fit within their respective holes of the first and/or second plates of the frame and on or against their respective landing areas or surfaces of the compensator such that the compensator is in substantial contact with, and/or is disposed substantially adjacent to, the first and second plates of the frame.

32. The method of claim 31, further comprising at least one of:

bonding a first support member between a first portion of the first plate and a first portion of the second plate and/or bonding a second support member between a second portion of the first plate and a second portion of the second plate; and disposing a first support member between a first portion of the first plate and a first portion of the second plate and disposing a second support member between a second portion of the first plate and a second portion of the second plate, the first and second support members being integrally formed with the first plate and the second plate, thereby forming a single part.

33. The method of claim 32, wherein the first support member and the second support member each comprise at least one of the same material or materials having one or more coefficients of thermal expansion that are at least one of: identical, substantially the same, and as close as practicable to each other.

34. The method of claim 33, further comprising attaching a mirror to the frame such that the mirror has a reflecting surface in a reflecting relation with the beamsplitter, wherein the compensator is disposed between the mirror and the beamsplitter and the optical assembly is substantially stable regarding the reflective relationship between the mirror and the beamsplitter.

35. The method of claim 34, further comprising at least one of:

(i) attaching a second mirror to the frame such that the second mirror has a reflecting surface facing away from an interior space of the frame, and the second mirror is in reflecting relation to the beamsplitter through a retroreflector, wherein at least one of: (i) the frame includes at least another hole that operates to receive at least one additional pin therein; (ii) the mirror and the second mirror each include at least one landing area that operates to receive the at least one additional pin thereon or thereagainst, thereby creating respective attachments between the frame and the mirror and the second mirror when the at least one additional pin is disposed in the at least another hole of the frame and is disposed on or against the at least one landing area of the mirror and/or the at least one landing area of the second mirror; (iii) the at least one additional pin comprises the same material as the material used for at least one of the frame, the mirror and the second mirror; and (iv) the mirror and the second mirror are made of at least one of: the same material as each other, the same material as the frame and the same material as the frame and each other; and (ii) disposing a protruding member on the frame such that the protruding member has a first portion extending from a surface of either the first plate or the second plate of the frame, a second portion, and a groove defining the first and second portions of the protruding member on each side of the groove, the groove of the protruding member being constructed to dissipate and/or eliminate one or more stresses passing through the protruding member, thereby preventing the one or more stresses from affecting the optical assembly.

36. The method of claim 35, further comprising aligning one or more of the first plate, the second plate, the first support member, the second support member, the mirror, the second mirror, the beamsplitter, the compensator, the three pins of the beamsplitter securing apparatus and the three pins of the compensator securing apparatus before locking the alignment in place with at least one of friction, fusing, bonding and adhering.

37. The method of claim 36, wherein at least one of:

(i) at least one of the first and said second portions of said protruding member is at least one of: having a substantially circular shape and being of any geometric shape;

(ii) the first portion of the protruding member is smaller than the second portion of the protruding member;

(iii) the first portion of the protruding member has a surface that is in contact with either the first plate or the second plate of the frame and the surface of the first portion of the protruding member has at least one of: a smaller diameter than a lateral cross-section and/or a bottom surface of the second portion of the protruding member that is disposed in an opening of a mount that operates to secure the optical assembly in place; and a smaller surface area than a lateral cross-section and/or a bottom surface of the second portion that is disposed in the opening of the mount that operates to secure the optical assembly in place;

(iv) the first portion of the protruding member has a smaller volume than the second portion of the protruding member;

(v) the groove is at least one of: a space between the frame and at least one of the second portion of the protruding member and the mount such that the frame is spaced away from the at least one of the second portion of the protruding member and the mount; and operating to achieve and/or maintain at least one of: dimensional stability, a predetermined degree of flatness and a high degree of flatness of at least one of: about $\lambda/10$, about $\lambda/15$, about $\lambda/20$, about $\lambda/30$, between about $\lambda/10$ and about $\lambda/15$, between about $\lambda/10$ and about $\lambda/20$, between about $\lambda/10$ and about $\lambda/30$, between about $\lambda/15$ and about $\lambda/20$, between about $\lambda/15$ and about $\lambda/30$ and between about $\lambda/20$ and about $\lambda/30$;

(vi) the protruding member is at least one of integrally formed with the surface of the first plate or the second plate; and bonded to the surface of the first plate or the second plate, the bonding being at least one of fusing and adhering;

(vii) the groove of the protruding member extends along and/or in communication with a perimeter of the first portion of the protruding member and is at least one of: having a substantially circular shape; and being of any geometric shape;

(viii) the groove of the protruding member includes at least one of: one or more right angles, one or more slopes, one or more chamfered surfaces having a consistent slope, one or more chamfered surfaces having a changing convex slope, one or more chamfered surfaces having a changing concave slope, and one or more tapers;

(ix) the groove is formed at substantially a right angle such that a first portion of an outer surface of the protruding member extends from the second portion of the protruding member inwardly substantially parallel to the surface of the first portion of the protruding member and a second portion of the outer surface of the protruding member extends from the first portion of the outer surface vertically substantially at a right angle and/or perpendicular to the surface of the first portion of the protruding member; and (x) the one or more stresses comprises at least one of: connection and/or clamping stress resulting from clamping the protruding member to the mount, stress passing through the mount, stress passing through the protruding member, sheer stress, rotational stress and stress resulting from one or more changes in temperature.

38. The method of claim 22, further comprising disposing one or more recesses on a surface of at least one of the first plate and the second plate, the one or more recesses operating to dissipate heat.

\* \* \* \* \*